US010085106B2

(12) United States Patent
Chang

(10) Patent No.: US 10,085,106 B2
(45) Date of Patent: Sep. 25, 2018

(54) SOUND CONTROL DEVICE FOR VEHICLE AND METHOD FOR CONTROLLING THE SAME

(71) Applicants: Hyundai Motor Company, Seoul (KR); Kia Motors Corporation, Seoul (KR)

(72) Inventor: Kyoung Jin Chang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 9 days.

(21) Appl. No.: 15/629,231

(22) Filed: Jun. 21, 2017

(65) Prior Publication Data

US 2018/0070191 A1 Mar. 8, 2018

(30) Foreign Application Priority Data

Sep. 2, 2016 (KR) ........................ 10-2016-0113150

(51) Int. Cl.

| | |
|---|---|
| ***H04B 1/00*** | (2006.01) |
| ***H04S 7/00*** | (2006.01) |
| ***G10K 11/178*** | (2006.01) |
| ***H04R 3/00*** | (2006.01) |
| *H04R 5/04* | (2006.01) |

(52) U.S. Cl.

CPC ............ *H04S 7/301* (2013.01); *G10K 11/178* (2013.01); *G10K 11/17817* (2018.01); *G10K 11/17854* (2018.01); *G10K 11/17883* (2018.01); *G10K 11/17885* (2018.01); *H04R 3/00* (2013.01); *G10K 2210/1282* (2013.01); *G10K 2210/51* (2013.01); *H04R 5/04* (2013.01); *H04R 2499/13* (2013.01); *H04S 7/30* (2013.01)

(58) Field of Classification Search

USPC ......... 381/86, 302, 58, 73.1, 71.4, 365, 389, 381/317, 71.1, 71.14

See application file for complete search history.

(56) References Cited

U.S. PATENT DOCUMENTS

2005/0033786 A1* 2/2005 Poluzzi .................. H04R 3/005 708/300
2006/0269078 A1 11/2006 Sakamoto et al.
2008/0192954 A1* 8/2008 Honji ..................... G10K 15/04 381/86

(Continued)

FOREIGN PATENT DOCUMENTS

JP 2007-269050 A 10/2007
JP 2008213754 A 9/2008
JP 2009298288 A 12/2009

*Primary Examiner* — Yosef K Laekemariam

(74) *Attorney, Agent, or Firm* — Mintz Levin Cohn Ferris Glovsky and Popeo, P.C.; Peter F. Corless

(57) ABSTRACT

A sound control device includes a sound collector for collecting a first sound signal generated from a noise source and deformed along a primary path between the noise source and a sound input unit, and a second sound signal generated through a speaker and deformed along a secondary path between the speaker and the sound input unit; and a sound controller for updating an adaptive filter in a designed adaptive control logic with at least one of the collected first and second sound signals and a preset target sound, and generating a sound effect that reflects the secondary path based on the updated adaptive filter.

12 Claims, 27 Drawing Sheets

(56) References Cited

U.S. PATENT DOCUMENTS

| | | | | |
|---|---|---|---|---|
| 2010/0195844 | A1 | 8/2010 | Christoph et al. | |
| 2010/0329488 | A1* | 12/2010 | Holub | H04R 27/00 381/301 |
| 2013/0028436 | A1* | 1/2013 | Christoph | H04R 3/00 381/73.1 |
| 2015/0078572 | A1 | 3/2015 | Milani | |
| 2016/0071508 | A1 | 3/2016 | Wurm et al. | |

* cited by examiner

SOUND CONTROL DEVICE FOR VEHICLE AND METHOD FOR CONTROLLING THE SAME

CROSS-REFERENCE TO RELATED APPLICATION

This application claims under 35 U.S.C. § 119(a) the benefit of Korean Patent Application No. 10-2016-0113150, filed on Sep. 2, 2016, the entire contents of which are incorporated herein by reference.

BACKGROUND

1. Technical Field

The present disclosure relates to a sound control device for a vehicle and a method for controlling the sound control device, whereby a target sound may be stably followed regardless of a change in outside noise.

2. Description of the Related Art

Vehicles typically are equipped with a variety of electronic devices taking into account the comfort and safety of a driver. For example, a sound control device may be provided to enhance enjoyment of the driver with respect to sound.

In this regard, however, the sound is likely to be deformed by various circumstantial changes while the vehicle is running, so the sound control device might cause negative effects on the driver. Accordingly, studies have been conducted to find a method for providing sounds to provide a pleasant feeling regardless of the various circumstantial changes.

SUMMARY

The present disclosure provides a sound control device for a vehicle, and a method for controlling the sound control device, by which sound effects are stably provided regardless of circumstantial changes.

In accordance with one aspect of the present disclosure, a sound control device includes a sound collector for collecting a first sound signal generated from a noise source and deformed along a primary path between the noise source and a sound input unit, and a second sound signal generated through a speaker and deformed along a secondary path between the speaker and the sound input unit; and a sound controller for updating an adaptive filter in a designed adaptive control logic with at least one of the collected first and second sound signals and a preset target sound, and generating a sound effect that reflects the secondary path based on the updated adaptive filter.

Here, the sound collector is configured to receive a third sound signal generated from the noise source through another sound input unit arranged around the sound source, and wherein the sound controller is configured to update the adaptive filter by using a value resulting from application of a secondary path compensation filter generated based on an estimated secondary path transfer function to the third sound signal, the first sound signal, the second sound signal, and the preset target sound as arguments.

Also, the noise source comprises an engine mounted in a vehicle, and wherein the sound controller is configured to update the adaptive filter by selecting a target sound corresponding to revolution per minute (rpm) of the engine from among a plurality of preset target sounds and using the selected target sound as an argument.

Also, the sound controller is configured to update the adaptive filter by selecting a target sound corresponding to the rpm of the engine and using a value resulting from subtraction of the selected target sound from a sum of the first and second sound signals as an argument.

Also, the sound controller is configured to generate the sound effect based on the updated adaptive filter and a secondary path inverse-compensation filter generated based on the inverse function of an estimated secondary path transfer function Also, the sound controller is configured to update an adaptive filter in the adaptive control logic with the collected first and second sound signals and generate a sound effect by subtracting a value resulting from application of the preset target sound to a secondary path inverse-compensation filter generated based on the inverse function of an estimated secondary path transfer function from a value derived from the updated adaptive filter.

Also, the sound controller is configured to use data related to estimated secondary path transfer functions stored in a memory to select an estimated secondary path transfer function corresponding to vehicle information, and to determine an adaptive control logic to generate a sound effect based on a form of the selected estimated secondary path transfer function.

In accordance with still another aspect of the present disclosure, a sound control device includes an analyzer for determining a pre-filter by inputting a sample signal to an adaptive control logic offline; and a sound controller for updating an adaptive filter included in an online adaptive control logic with a first sound signal generated from a noise source and deformed along a primary path between the noise source and a sound input unit, a second sound signal generated through a speaker and deformed along a secondary path between the speaker and the sound input unit, and a preset target sound, and generating a sound effect using the updated adaptive filter and the determined pre-filter.

Also, the sound control device further includes a sound collector for collecting at least one of the first sound signal, the second sound signal, and a third sound signal input through a sound input unit arranged around the noise source.

Also, the sound controller is configured to update the adaptive filter by using the first sound signal, the second sound signal, a third sound signal input through a sound input unit arranged around the noise source, and the preset target sound as arguments.

Also, the noise source comprises an engine mounted in a vehicle, and wherein the sound controller is configured to update the adaptive filter by selecting a target sound corresponding to revolution per minute (rpm) of the engine from among a plurality of preset target sounds and using the selected target sound as an argument.

Also, the sound controller is configured to update the adaptive filter by selecting a target sound corresponding to the rpm of the engine and using a value resulting from subtraction of the selected target sound from a sum of the first and second sound signals as an argument.

In accordance with one aspect of the present disclosure, a method for controlling a vehicle includes steps of: collecting a first sound signal generated from a noise source and deformed along a primary path between the noise source and a sound input unit, and a second sound signal generated through a speaker and deformed along a secondary path between the speaker and the sound input unit; updating an adaptive filter in a designed adaptive control logic with at least one of the collected first and second sound signals and a preset target sound; and generating a sound effect that reflects the secondary path based on the updated adaptive filter.

Here, the step of collecting further includes: receiving a third sound signal generated from the noise source through another sound input unit arranged around the sound source, and the step of generating further includes: updating the adaptive filter by using a value resulting from application of a secondary path compensation filter generated based on an estimated secondary path transfer function to the third sound signal, the first sound signal, the second sound signal, and the preset target sound as arguments.

Also, the step of generating further includes: selecting a target sound corresponding to revolutions per minute (rpm) of an engine from among preset target sounds and updating the adaptive filter by using a value resulting from subtraction of the selected target sound from a sum of the first and second sound signals as an argument.

Also, the step of generating further includes: generating the sound effect based on the updated adaptive filter and a secondary path inverse-compensation filter generated based on the inverse function of an estimated secondary path transfer function.

Also, the step of generating further includes: updating an adaptive filter in the adaptive control logic with the collected first and second sound signals and generate a sound effect by subtracting a value resulting from application of the preset target sound to a secondary path inverse-compensation filter generated based on the inverse function of an estimated secondary path transfer function from a value derived from the updated adaptive filter.

As described above, it is possible to provide outstanding sound effects regardless of various circumstantial changes.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
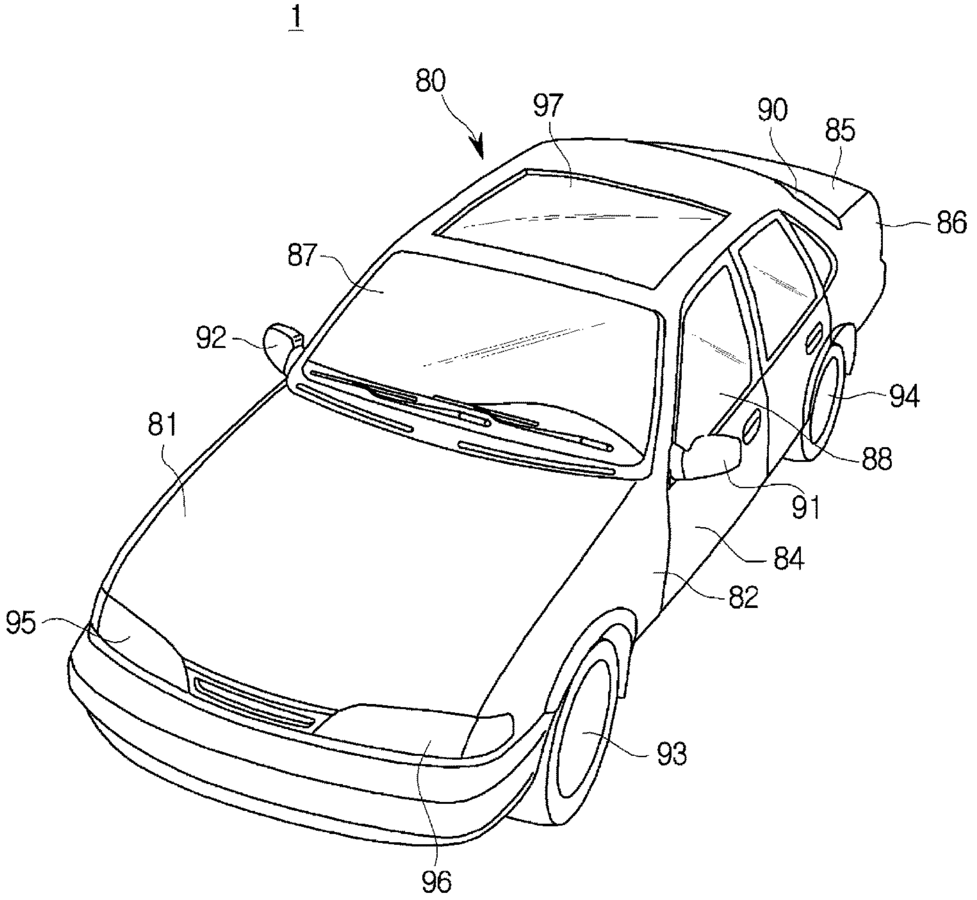
FIG. 1 is a perspective view schematically illustrating the exterior of a vehicle, according to an embodiment of the present disclosure.
Figure 2:
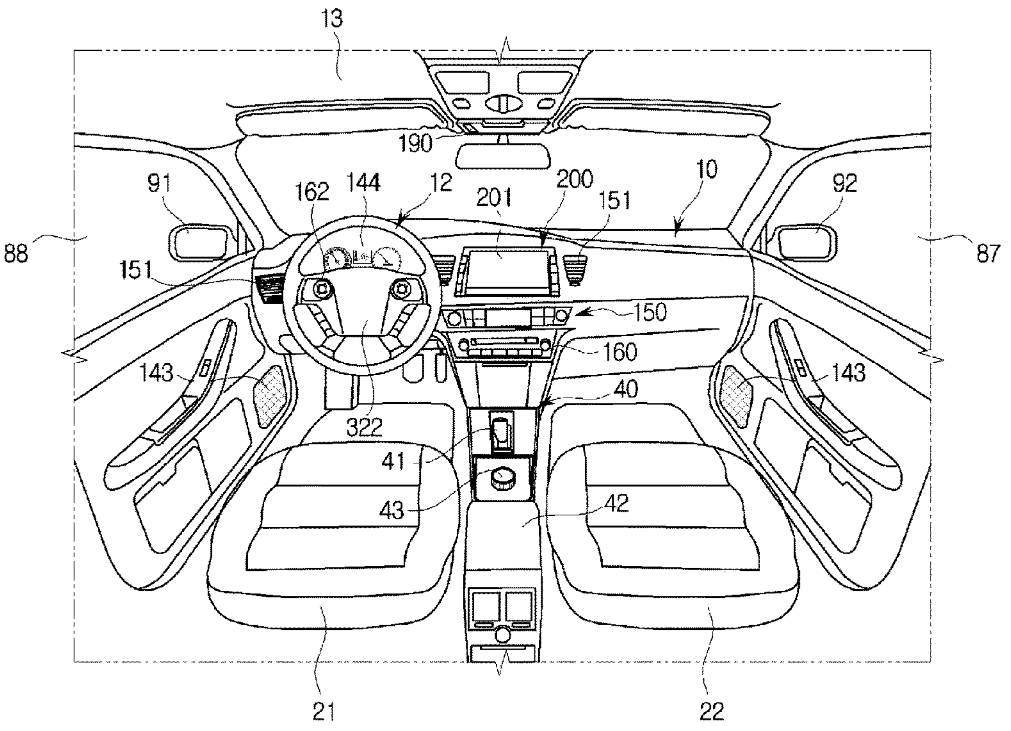
FIG. 2 illustrates internal features of a vehicle, according to an embodiment of the present disclosure.

FIG. 1 is a perspective view schematically illustrating the exterior of a vehicle, according to an embodiment of the present disclosure, and FIG. 2 illustrates internal features of a vehicle, according to an embodiment of the present disclosure. FIGS. 1 and 2 are described together to avoid overlapping explanation.

Referring to FIG. 1, a vehicle 1 may include a car frame 80 that forms the exterior of the vehicle 1, and wheels 93, 94 for moving the vehicle 1. The car frame 80 may include a hood 81, a front fender 82, doors 84, a trunk lid 85, and a quarter panel 86. The car frame 80 may also include a sunshine roof 97, as shown in FIG. 1. The term 'sunshine roof' 97 may be interchangeably used with a sun roof, which will be used herein for convenience of explanation.

Further, there may be a front window 87 installed on the front of the car frame 80 to allow the driver and passengers to see a view ahead of the vehicle 1, side windows 88 to allow the driver and passengers to see side views, side mirrors 91, 92 installed on the doors 84 to allow the driver to see areas behind and to the sides of the vehicle 1, and a rear window 90 installed on the rear of the car frame 80 to allow the driver or passengers to see a view behind the vehicle 1.

There may also be head lamps 95, 96 installed on the outer front of the car frame 80 of the vehicle 1 for turning on headlights to secure views ahead of the vehicle 1. Further, there may be tail lamps (not shown) installed on the rear of the car frame 80 of the vehicle 1 for turning on taillights to secure views behind the vehicle 1 or help a driver driving a car behind the vehicle 1 to locate the vehicle 1 as well. Operation of the sun roof 97, head lamps 95, 96, and/or tail lamps may be controlled according to control commands from the user. The internal features of the vehicle 1 will now be described.

An air conditioner 150 may be equipped in the vehicle 1. The air conditioner 150, as will be described below, refers to a system for controlling air conditioning conditions, such as indoor/outdoor environmental conditions, air suction/exhaustion state, cooling/heating state, etc., of the vehicle 1 automatically or in response to a control command from the user. For example, the air conditioner 150 may control temperature of the inside of the vehicle 1 by releasing heated or cooled air through air ducts 151.

There may be a navigation terminal 200 arranged in the vehicle 1. The navigation terminal 200 may refer to a system for providing Global Positioning System (GPS) functions to give the user directions to a destination. The navigation terminal 200 may also provide an integrated audio and video function. The navigation terminal 200 may generate control signals according to control commands input from the user through various input devices to control devices in the vehicle 1.

For example, the navigation terminal 200 may selectively display at least one of audio, video, and navigation screens through a display 201, and may also display various control screens related to controlling the vehicle 1.

The display 201 may be located in a center fascia 11, which is a center area of a dashboard 10. In an embodiment, the display 201 may be implemented with Liquid Crystal Displays (LCDs), Light Emitting Diodes (LEDs), Plasma Display Panels (PDPs), Organic Light Emitting Diodes (OLEDs), Cathode Ray Tubes (CRTs), etc., without being limited thereto. If the display 201 is implemented in a touch screen type, the display 201 may receive various control commands from the user through various touch gestures, such as touching, clicking, dragging, etc.

A navigation input unit 202 may be implemented in a button type at an area adjacent to the display 201. Accordingly, the driver may input various control commands by manipulating the navigation input unit 202. The navigation input unit 202 may be implemented by an input device including buttons, through which control commands are input in various input methods, enabling the driver to input a control command more easily even while the driver is driving the vehicle 1.

In the meantime, a center input unit 43 of a jog shuttle type or button type may be located in a center console 40. The center console 40 corresponds to a part located between a driver seat 21 and a passenger seat 22, and has a gear-shifting lever 41 and a tray 42. The center input unit 43 may perform all or part of the function of the navigation input unit 202. If the center input unit 43 is also implemented in the button type, control commands may be input through various input methods.

A cluster 144 may be arranged in the vehicle 1. The cluster 144 may also be called an instrument panel, but for convenience of explanation, the term 'cluster' 144 will be just used in the following description. On the cluster 144, traveling speed, revolution per minute (rpm), an amount of fuel left of the vehicle 1, etc., are indicated.

Further, there may be a sound input unit 190 arranged in the vehicle 1. For example, the sound input unit 190 may include a microphone. The sound input unit 190 may receive various sound signals through the microphone and convert them to electronic signals. In an embodiment, a sound control device may provide sound effects that give the user a pleasure even if a circumstantial change occurs, by updating a filter included in an adaptive control logic with an error signal input through the sound input unit 190. This will be described in more detail later.

To effectively input a sound signal, the sound input unit 190 may be mounted in a head lining 13, as shown in FIG. 2. However, where to place the sound input unit 190 is not limited to the head lining 13, and the sound input unit 190 may also be mounted on the dashboard 10 or on a steering wheel 12, without being limited thereto.

Moreover, a speaker 143 for outputting sounds may be equipped in the vehicle 1. Accordingly, the vehicle 1 may output a sound through the speaker 143 required in performing audio, video, navigation, and other additional functions. Besides, the vehicle 1 may output sound effects through the speaker 143 that give the driver a pleasure, without being limited thereto. A sound control system equipped in the vehicle will now be schematically described.

Figure 3:
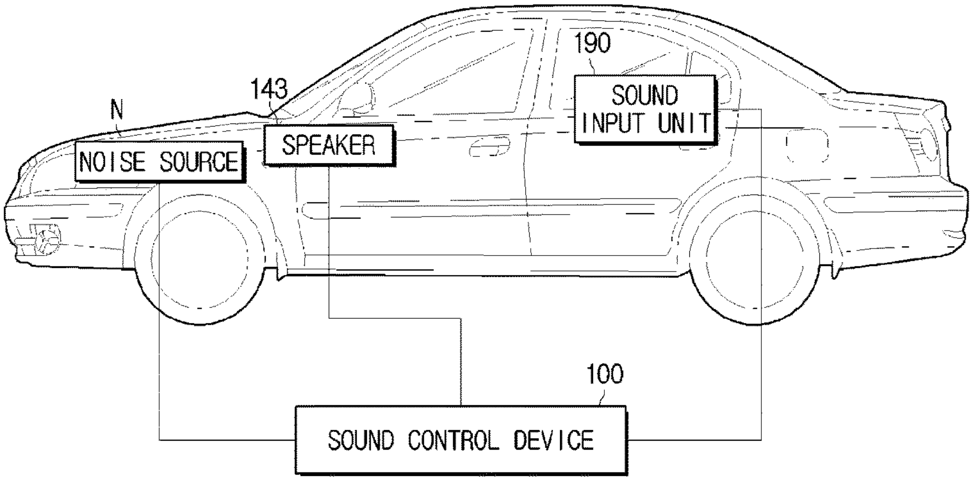
FIG. 3 is a schematic block diagram of a sound control system in a vehicle, according to an embodiment of the present disclosure.

FIG. 3 is a schematic block diagram of a sound control system in a vehicle, according to an embodiment of the present disclosure.

Referring to FIG. 3, in the vehicle 1, there may be many different noise sources N. In an embodiment, operation of an internal component of the vehicle 1, such as an engine may make vibration noise.

If the noise occurs in reconstructing a driving sound, the user in the vehicle 1 may not listen to a desired driving sound due to the noise. That is, due to the mixing of the driving sound and noise, the user would listen to entirely different sound. This might cause negative effects on the user.

In addition, a sound may be deformed by various circumstantial changes. The circumstantial changes may be made by various factors, such as window opening, changes in temperature inside the vehicle 1, changes in engine sound, etc. For another example, a change in sound may be made due to a structural feature of the vehicle 1. Specifically, the sound may be different by position to which the sound is output, e.g., a sound around the speaker may be different from the sound at a position where the user recognizes the sound.

Accordingly, in an embodiment, a sound control device 100 may follow a target sound while canceling noise by an active control logic of an open loop form to feedback a result of comparison between a sound around the noise source N, a sound output from the speaker 143, and a sound input from the sound input unit 190 arranged in an area around the user.

For example, the sound control device 100 may receive a sound generated by a sound generation source, such as the noise source N or the speaker 143 through the sound input unit 190, and determine a path between the sound generation source and the sound input unit 190 based on an adaptive control logic. Accordingly, the sound control device 100 in accordance with an embodiment may provide sound effects least affected by noise or circumstantial changes, by designing an adaptive control logic to follow a predetermined target sound while canceling noise based on the determined path. The sound effects may include both a sound which follows a target sound while canceling noise and a sound that simply cancels noise, without being limited thereto.

In the following description, take an engine as an example of the noise source N. However, embodiments of the present disclosure are not limited thereto, but may be applied to any different noise source N that makes noise in the vehicle 1.

The target sound refers to a sound that gives the user an effect, such as an immersive feeling. For example, the target sound may be generated based on at least one of engine rpm, vehicle speed, tire rpm, wheel rpm, transmission shaft rpm, pressure in the engine's intake manifold, ignition angle of the engine, an amount of change in vehicle speed, and displacement of the engine mount. For convenience of explanation, assume, for example, that the target sound is generated based on the engine rpm, but embodiments of the present disclosure are not limited thereto.

The sound control device 100 in accordance with an embodiment may reconstruct a constant sound effect regardless of external factors. A method for reconstructing a constant sound effect regardless of external factors will now be described.

Figure 4:
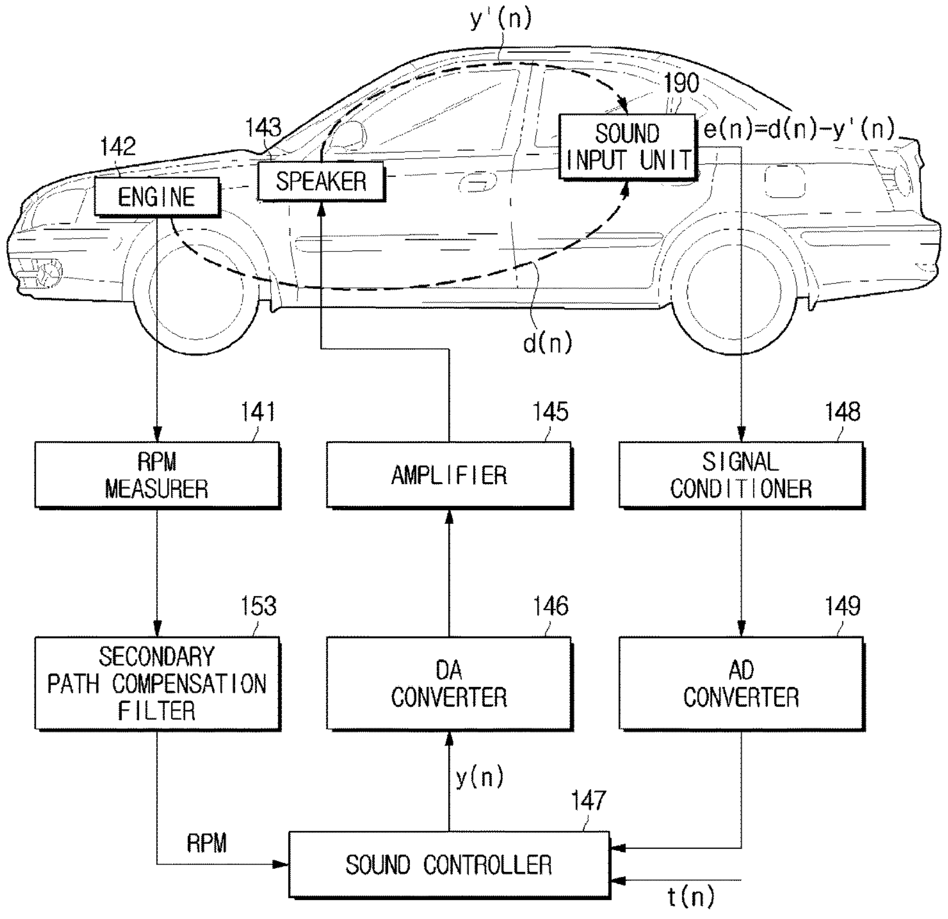
FIG. 4 is a block diagram of a sound control system in a vehicle using a secondary path compensation filter, according to an embodiment of the present disclosure.
Figure 5:
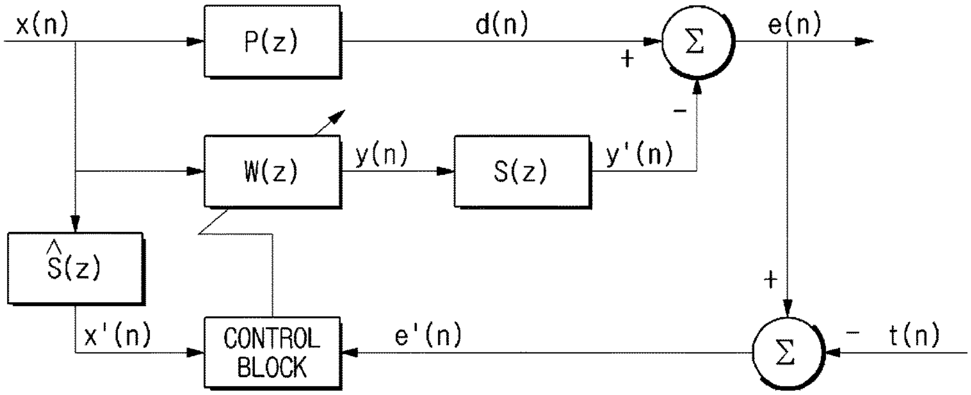
FIG. 5 is a block diagram of an adaptive control logic using a secondary path compensation filter, according to an embodiment of the present disclosure.

FIG. 4 is a block diagram of a sound control system in a vehicle using a secondary path compensation filter, according to an embodiment of the present disclosure, and FIG. 5 is a block diagram of an adaptive control logic using a secondary path compensation filter, according to an embodiment of the present disclosure. FIGS. 4 and 5 are described together to avoid overlapping explanation.

Referring to FIG. 4, a sound control system may include not only an engine 142, a speaker 143, and a sound input unit 190, but also an rpm measurer 141, an amplifier 145, a Digital-to-Analog (DA) converter 146, a sound controller 147, a signal conditioner 148, and an Analog-to-Digital (AD) converter 149.

In an embodiment, the enumerated components may be independently implemented and connected to one another over a communication network. In another embodiment, at least one of the rpm measurer 141, the amplifier 145, the DA converter 146, the sound controller 147, the signal conditioner 148, and the AD converter 149 may be integrated on a single circuit board or in a System-on-Chip (SoC), without being limited thereto.

The sound control device 100 may include at least one of the rpm measurer 141, the amplifier 145, the DA converter 146, the sound controller 147, the signal conditioner 148, and the AD converter 149. Operation of each of the enumerated components will now be described.

First, the rpm measurer 141 may measure the rpm of the engine 142 and send the rpm value to a device in the vehicle 1 over a communication network in the vehicle 1.

The rpm value sent may be used in many different services. For example, the rpm value sent through the communication network in the vehicle 1 may be displayed on the cluster 144 as shown in FIG. 2 and used in a guide service that helps the driver know of the driving state. For another example, the rpm value may be sent to the sound controller 147 over the communication network in the vehicle 1, and the sound controller 147 may use the rpm value in a service for providing a sound effect, such as by selecting a predetermined target sound corresponding to the rpm value and inputting the target sound as an argument to an estimated secondary path transfer function.

The amplifier 145 amplifies the sound signal. For example, the amplifier 145 amplifies a sound signal sent from the DA converter 146 and sends the amplified sound signal to the speaker 143.

The DA converter 146 converts a digital signal to an analog signal. The DA converter 146 may convert a digital sound signal received from the sound controller 147 to an analog sound signal and send the analog sound signal to the amplifier 145.

The sound input unit 190 may receive various sound signals generated in the interior of the vehicle 1. The sound control system in accordance with an embodiment may properly follow a target sound by making use of an adaptive control logic that reflects a sound signal input through the sound input unit 190 in designing an adaptive filter as will be described below, even if a circumstance in the vehicle 1 is changed over time.

The signal conditioner 148 may amplify the sound signal input through the sound input unit 190. The AD converter 149 may convert the amplified sound signal to a digital signal.

Referring to FIG. 4, the sound control system may include the sound controller 147. The sound controller 147 may be implemented by a device capable of performing various operation processes, such as a micro controller unit (MCU) and a processor, and a memory. The sound controller 147 may output a sound effect through an adaptive control logic of an open loop form that uses various sound signals as arguments.

For example, the sound controller 147 may store data related to the adaptive control logic as will be described below, and generate a sound effect using the adaptive control logic based on the data stored in its memory.

FIG. 5 is a block diagram of an adaptive control logic of an open loop type using a secondary path compensation filter, according to an embodiment of the present disclosure.

Referring to FIG. 5, a sound signal x(n) generated by an engine of the vehicle 1 may be input to the adaptive control logic. The x(n) may be input in various methods. For example, the x(n) may be input through e.g., the microphone arranged around the engine 142. The x(n) is also called a reference signal, and may be referred to as any other term well known to ordinary skilled people in the art.

The sound signal x(n) generated by the engine 142 is delivered to the sound input unit 190 via the interior of the vehicle 1, as shown in FIG. 4. The sound generated by the engine 142 might be deformed by a circumstantial change, a structural feature of the vehicle 1, etc., as described above. Accordingly, a sound d(n) input to the sound input unit 190 may be equal to or different from the x(n). The d(n) is also called a primary signal.

Accordingly, when a factor to deform the x(n) is represented by a primary path transfer function P(z), the x(n) is deformed to the d(n) via the primary path transfer function. A primary path corresponds to a path between an area around the engine 143 and an area in which the sound input unit 190 is located, and the d(n) may be represented as x(n)*P(n). The P(z) is the primary path transfer function. Here, n refers to time and z refers to frequency.

In the meantime, when a path between an area in which the speaker 143 is located and an area in which the sound input unit 190 is located corresponds to a secondary path, a sound signal output through the speaker 143 is input to the sound input unit 190 via a secondary path transfer function S(z).

In general, as a difference between the sound signal d(n) via the primary path and a sound signal y'(n) via the secondary path, i.e., a first error signal, becomes nearer to '0', the noise is minimized. In this case, however, there is a disadvantage in that it just cancels the noise but fails to provide a target sound. Accordingly, a need exists for a modified algorithm to constantly provide a target sound that the user wants while minimizing the noise deformed through the primary path.

In the following description, for convenience of explanation, a sound signal that has passed the primary path is called a first sound signal, a sound signal that has passed the secondary path is called a second sound signal, and the x(n) is called a third sound signal or a reference signal.

A first error signal e(n) is a difference between the first sound signal and the second sound signal, which may be expressed as in the following equation 1:

$$e(n)=d(n)-y'(n) \quad (1)$$

In an embodiment, the control logic may represent a second error signal e'(n) to follow a target sound, as in the following equation 2:

$$e'(n)=d(n)-y'(n)-t(n) \quad (2)$$

where t(n) corresponds to a target sound. For example, the target sound may be determined in advance based on the rpm value of the engine. Once receiving the rpm value, the control block may select a target sound corresponding to the received rpm value, and use the second error signal e'(n) resulting from subtraction of the target sound from the first error signal as an argument in designing an adaptive filter.

Further, the control block in accordance with an embodiment may use an argument by applying an estimated transfer function for the secondary path, i.e., an estimated secondary path transfer function, to the x(n) in designing an adaptive filter. The estimated transfer function for the secondary path is also called a secondary path compensation filter.

Referring to FIG. 5, $\hat{S}(z)$ refers to the estimated transfer function for the secondary path. In other words, $\hat{S}(z)$ refers to a transfer function for a predicted secondary path.

For example, the estimated transfer function for the secondary path may be determined in advance through modeling, and stored in an internal memory of the sound control device 100 or in another memory equipped in the vehicle 1.

To cancel sound deformation due to various circumstantial changes, an influence by the secondary path should be taken into account in advance. For example, the sound control device in accordance with an embodiment may generate a sound signal by calculating in advance the influence by the secondary path based on a filtered-X LMS (FxLMS), an example of an adaptive control algorithm.

Unlike an LMS algorithm that uses an input, i.e., a reference signal firsthand as an argument of the adaptive filter, the FxLMS algorithm may have the reference signal pass the modeled secondary path function $\hat{S}(z)$ and use the result as an input value to an FxLMS adaptive filter algorithm, i.e., as an argument of the adaptive filter.

The sound control device may achieve an effect of actually canceling the influence by the secondary path by reflecting the secondary path in advance with the modeled estimated transfer function for the secondary path. The adaptive filter value may be represented by the following equation 3:

$$w(n+1)=w(n)+\mu\cdot e'(n)\cdot x'(n) \quad (3)$$

where, n denotes time, w(n) denotes a filter coefficient at time n, and w(n+1) denotes an updated filter coefficient at time n+1. e'(n) denotes the second error signal as described above, and x'(n) denotes the reference signal that has passed the secondary path compensation filter. μ denotes a step size, which is a scale factor for the time of updating.

Referring to the equation 3, the sound control system in accordance with an embodiment may constantly reflect circumstantial changes of the vehicle 1 by updating the adaptive filter value based on the second error signal e'(n) including a preset target sound t(n), the second sound signal y'(n), etc., and the previous filter value w(n). The control block may steadily reduce the influence by the circumstantial changes by updating the adaptive filter value at a preset sampling rate.

A sound signal y(n) that has passed the adaptive filter may be expressed as in the following equation 4:

$$y(n)=w(n)*x(n) \tag{4}$$

As described above, a normal noise cancellation scheme embodies an adaptive filter such that the first error signal e(n) should become near to '0'. On the contrary, the sound control system in accordance with an embodiment of the present disclosure may preset a target sound corresponding to the engine's rpm value, and then reflect this in the second error signal e'(n).

In other words, the sound control system in accordance with the embodiment of the present disclosure ensures to follow a target sound by reflecting a preset target sound as an argument in designing the adaptive filter. Specifically, the sound control system may subtract the preset target sound t(n) from the first error signal e(n) as in equation 2, and then input the resultant value as an argument to the adaptive filter as in equation 3.

As characteristics of the noise source N, and noise transfer environments change over time, the amplitude, phase, and frequency of the noise also change as well. Accordingly, the vehicle 1 in accordance with an embodiment of the present disclosure may apply an adaptive control algorithm to constantly update the adaptive filter value, thereby embodying a target sound that reflects the circumstantial change.

For example, there is an Active Noise Cancellation (ANC) scheme for reducing noise by generating a signal with opposite phase to the original signal, and an Active Sound Design (ASD) scheme for providing immersive sound effects. The ASD scheme has no effect of reducing noise but is just used to reconstruct a target sound.

Compared to the ANC scheme, the ASD scheme has an advantage of saving costs because it does not need to use the microphone and the adaptive control logic, but has a problem of reconstructing a different sound from the preset target sound due to an outside factor because it is unable to reflect the secondary path.

If the ANC and ASD schemes are combined to provide a target sound while canceling noise, a problem arises in that the ANC scheme that changes the phase and the ASD scheme that does not change the phase interfere with each other. To solve those problems, the sound control system in accordance with an embodiment of the present disclosure may apply an adaptive control logic of a type shown in FIG. 5 to provide sound effects that give pleasures while canceling noise. The adaptive control logic may be implemented in various types, which will now be described below.

Figure 6:
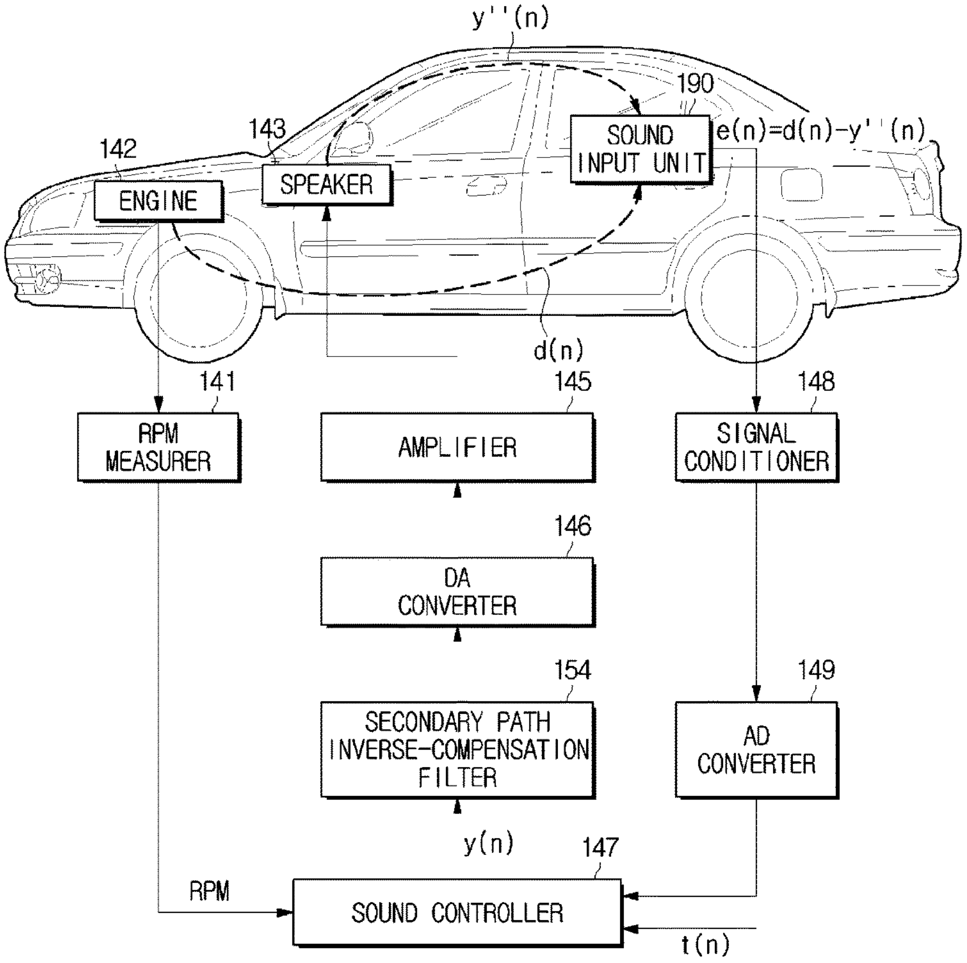
FIG. 6 is a block diagram of a sound control system in a vehicle using a secondary path inverse-compensation filter, according to an embodiment of the present disclosure.
Figure 7:
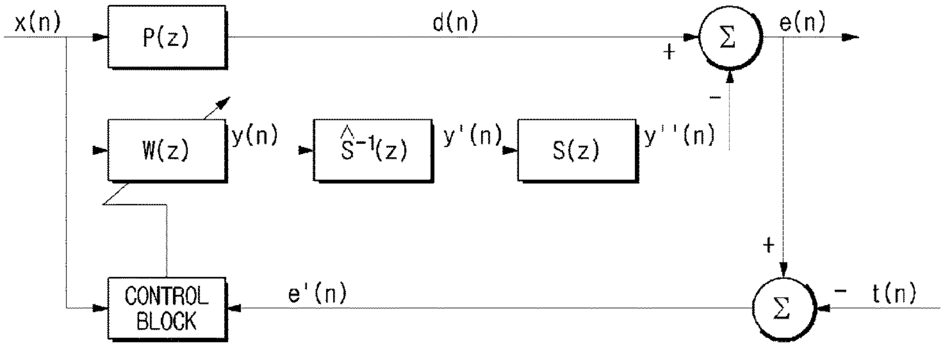
FIG. 7 is a block diagram of an adaptive control logic using a secondary path inverse-compensation filter, according to an embodiment of the present disclosure.

FIG. 6 is a block diagram of a sound control system in a vehicle using a secondary path inverse-compensation filter, according to an embodiment of the present disclosure, and FIG. 7 is a block diagram of an adaptive control logic using a secondary path inverse-compensation filter, according to an embodiment of the present disclosure. FIGS. 6 and 7 are described together to avoid overlapping explanation.

Referring to FIG. 6, a sound control system may include the engine 142, the speaker 143, the sound input unit 190, the rpm measurer 141, the amplifier 145, the Digital-to-Analog (DA) converter 146, the sound controller 147, the signal conditioner 148, and the Analog-to-Digital (AD) converter 149. The enumerated components are the same as what are described above, so the details will be omitted below.

The sound control system may include a secondary path inverse-compensation filter 154. The secondary path inverse-compensation filter 154 refers to a filter based on the inverse function of the estimated secondary path transfer function.

Referring to FIG. 7, P(z) corresponds to the primary path transfer function, and S(z) corresponds to the secondary path transfer function. A sound signal generated from the engine 142, i.e., a reference signal, is input to the sound input unit 190 via the primary path. Accordingly, the sound signal d(n) input to the sound input unit 190 may be represented by x(n)*P(n).

A sound signal y(n) that has been output from the control block and passed the adaptive filter may be represented by w(n)*x(n). The adaptive filter value may be represented as in the following equation 5:

$$w(n+1)=w(n)+\mu\cdot e'(n)\cdot x(n) \tag{5}$$

Examining the equation 5, the adaptive filter of FIG. 7 does not reflect the estimated transfer function for the secondary path, unlike the adaptive filter of FIG. 5. In the adaptive control logic in accordance with an embodiment, the inverse function $\hat{S}^{-1}(z)$ of the estimated secondary path transfer function inserted between the adaptive filter W(z) and the secondary path transfer function S(z) makes difference in the operation.

$\hat{S}^{-1}(z)$ is the inverse function of the estimated secondary path transfer function, and may be stored in an internal memory of the sound control device 100 or in another memory equipped in the vehicle 1. Alternatively, data related to the estimated secondary path transfer function $\hat{S}(z)$ is stored in the memory in advance, and the control block may derive the inverse function $\hat{S}^{-1}(z)$ of the estimated secondary path transfer function from the estimated secondary path transfer function $\hat{S}(z)$ through calculation, without being limited thereto.

Accordingly, the sound signal y'(n) output through the speaker 143 may be represented as in the following equation 6:

$$y'(n)=\hat{S}^{-1}(n)*y(n) \tag{6}$$

The sound signal y'(n) is deformed to a second sound signal y"(n) through the secondary path transfer function, and the resultant signal is input to the sound input unit 190. Accordingly, the first error signal e(n) may be represented by d(n)−y"(n), and the second error signal e' (n) input to the control block may be represented as in the following equation 7:

$$e'(n)=d(n)-y''(n)-t(n) \tag{7}$$

As such, the sound control system in accordance with embodiments of the present disclosure may design a control logic to follow a target sound by adding the target sound as an argument.

Meanwhile, a method that uses the inverse function of the estimated secondary path transfer function may be used when control stability of the sound control device or the sound control system is high, because the method requires the operation of $\hat{S}^{-1}(z)$ and has the sound signal y(n) that has passed the adaptive filter go through one more operation of $\hat{S}^{-1}(z)$ unlike what is shown in FIG. 5. The sound control device in accordance with embodiments of the present disclosure may select and use one of a plurality of adaptive control logics in generating sound effects, as will be described later.

Figure 8:
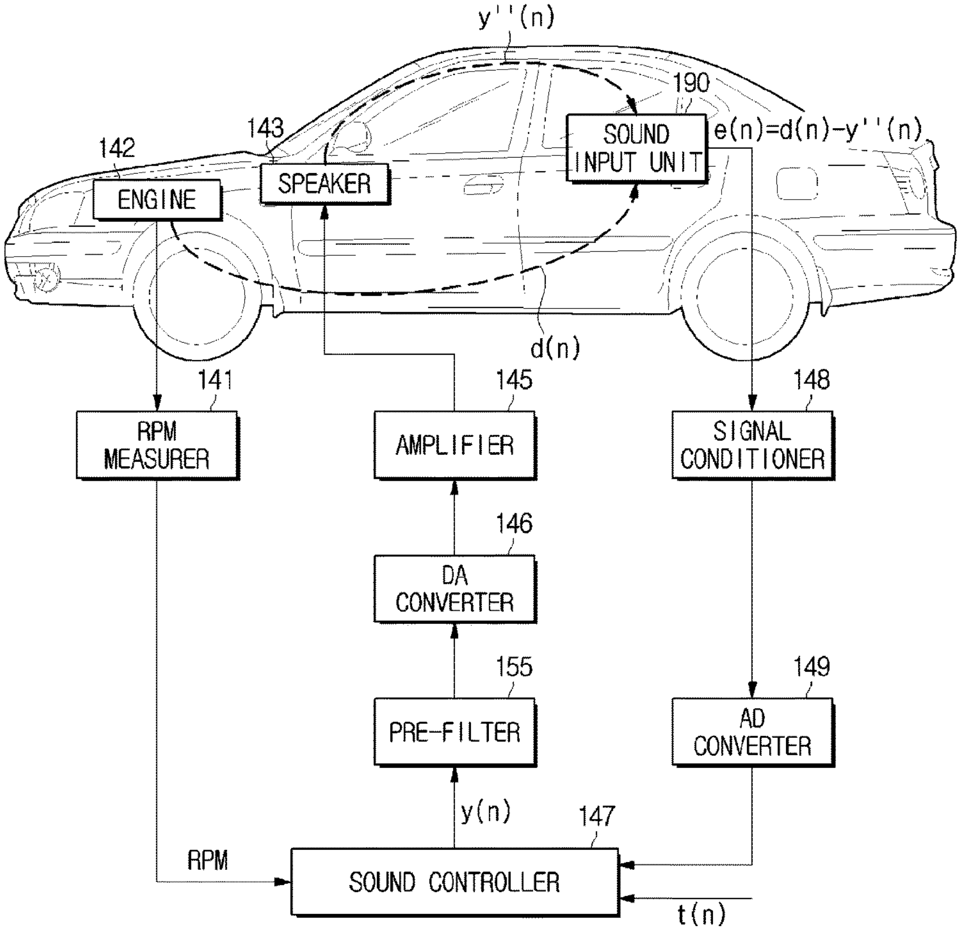
FIG. 8 is a block diagram of a sound control system in a vehicle using a pre-filter, according to an embodiment of the present disclosure.
Figure 9:
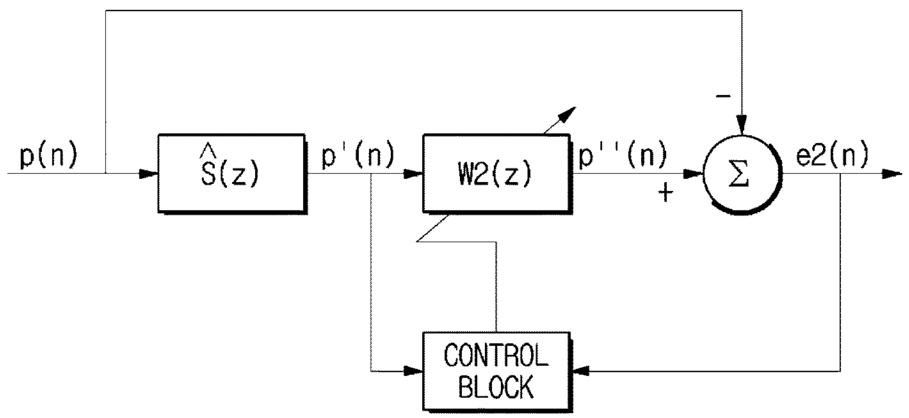
FIG. 9 is a block diagram of an offline adaptive control logic using a pre-filter, according to an embodiment of the present disclosure.
Figure 10:
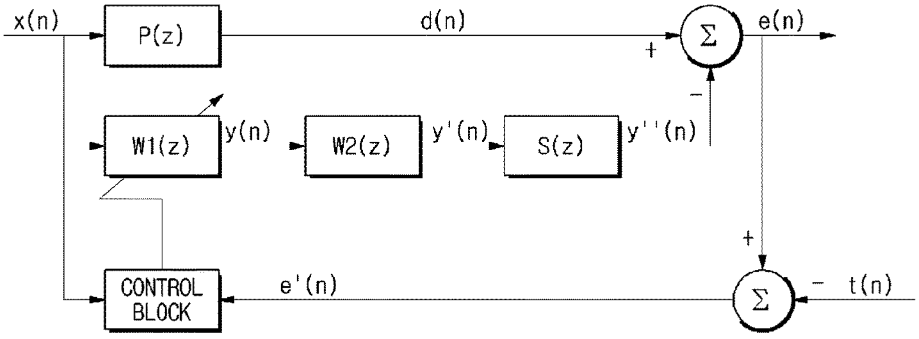
FIG. 10 is a block diagram of an online adaptive control logic using a pre-filter, according to an embodiment of the present disclosure.

FIG. 8 is a block diagram of a sound control system in a vehicle using a pre-filter, according to an embodiment of the present disclosure, FIG. 9 is a block diagram of an offline adaptive control logic using a pre-filter, according to an embodiment of the present disclosure, and FIG. 10 is a block diagram of an online adaptive control logic using a pre-filter, according to an embodiment of the present disclosure. FIGS. 8 to 10 are described together to avoid overlapping explanation.

Referring to FIG. 8, a sound control system may include the engine 142, the speaker 143, the sound input unit 190, the rpm measurer 141, the amplifier 145, the Digital-to-Analog (DA) converter 146, the sound controller 147, the signal conditioner 148, and the Analog-to-Digital (AD) converter 149. The enumerated components are the same as what are described above, so the details will be omitted below.

The sound control system may also include a pre-filter 155. The pre-filter 155 may be calculated offline in advance. As such, the sound control system in accordance with embodiments of the present disclosure may use both the online adaptive control logic and offline adaptive control logic, thereby reliably obtaining a substitute of the secondary path inverse-compensation filter value.

For example, referring to FIG. 9, a white noise signal p(n) may be input to the offline adaptive control logic. A white noise p'(n) that has passed the estimated secondary path transfer function may be represented as in the following equation 8:

$$p'(n)=\hat{S}(n)*p(n) \quad (8)$$

p'(n) may be input to the sound input unit 190 via the offline pre-filter. Accordingly, a sound signal p"(n) in the adaptive control logic shown in FIG. 9 may be represented as in the following equation 9:

$$p''(n)=w(n)*p'(n) \quad (9)$$

Accordingly, an offline error signal $e_2(n)$ may be represented as in the following equation 10:

$$e_2(n)=p''(n)-p(n) \quad (10)$$

Figure 11:
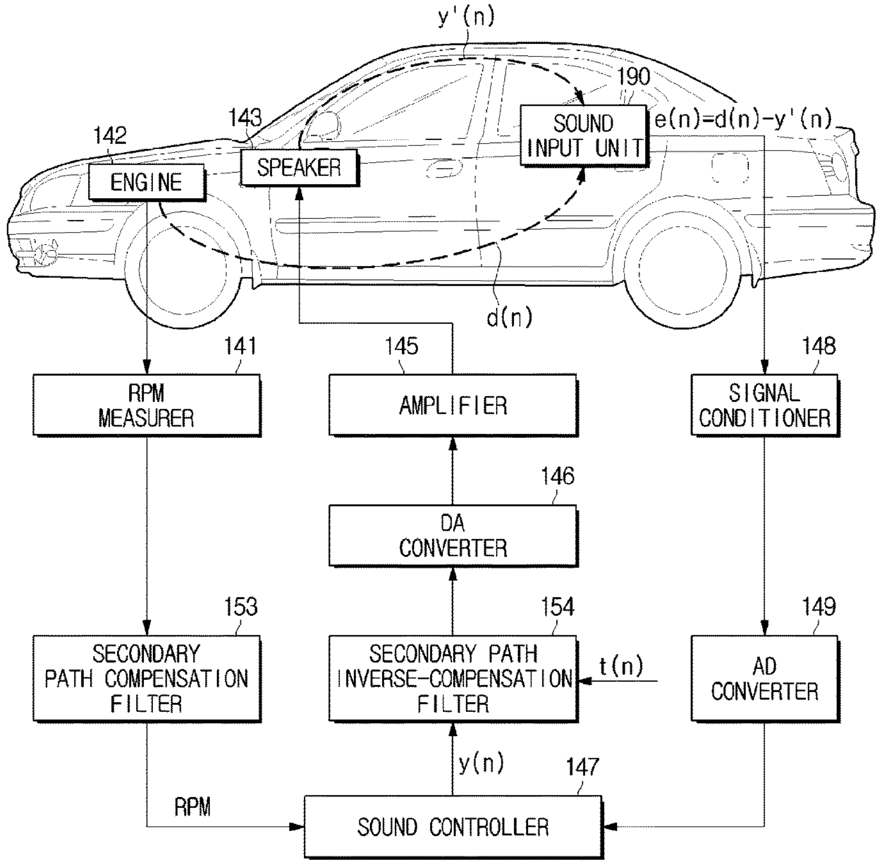
FIG. 11 is a block diagram of a sound control system in a vehicle with a secondary path inverse-compensation filter to which a target sound is input, according to an embodiment of the present disclosure.

The control block offline may design an offline pre-filter based on p'(n) and $e_2(n)$ as shown in FIG. 11.

$$w_2(n+1)=w_2(n)+\mu\cdot e_2(n)\cdot p'(n) \quad (11)$$

The sound control system may use the offline pre-filter value in embodying the target sound online. Specifically, before embodying the target sound, the sound control system may design an offline adaptive control logic, calculate a pre-filter value in advance, and apply the pre-calculated pre-filter value in embodying an actual target sound, thereby reducing an amount of calculation. Further, in an embodiment, the sound control system may calculate a pre-filter value corresponding to a substitute of the secondary path inverse-compensation filter value offline in advance, thereby increasing system stability.

The pre-filter value obtained by the adaptive control logic of FIG. 9 may be substituted for the pre-filter $w_2(z)$ of FIG. 10. Accordingly, the sound signal y(n) that has passed the adaptive filter corresponds to $w_1(n)*x(n)$, and the sound signal y'(n) that has passed the pre-filter corresponds to $w_2(n)*y(n)$. The adaptive filter may be represented as in the following equation 12:

$$w(n+1)=w_2(n)+\mu\cdot e'(n)\cdot x(n) \quad (12)$$

The first error signal e(n) corresponds to a difference between the first sound signal d(n) and the second sound signal y"(n), d(n)−y"(n), and the second error signal e' (n) may be represented as in the following equation 13:

$$e'(n)=d(n)-y''(n)-t(n) \quad (13)$$

In addition, the adaptive control logic in accordance with an embodiment of the present disclosure may be designed by combining the adaptive control logics shown in FIGS. 5 and 7.

Figure 12:
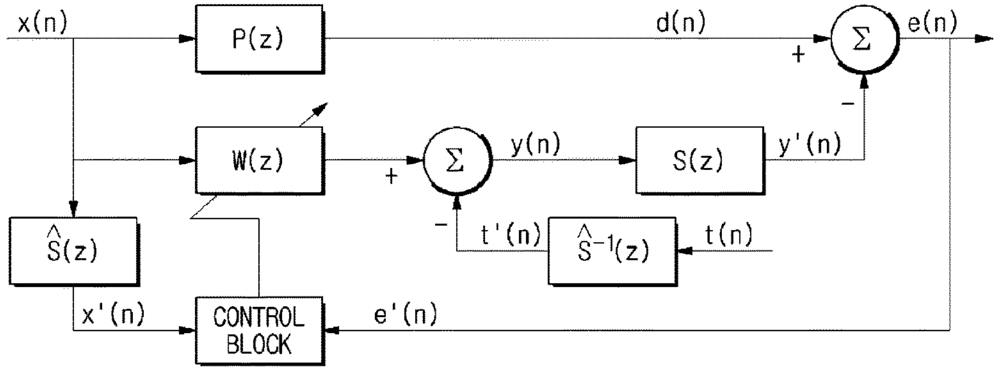
FIG. 12 is a block diagram of an adaptive control logic with a secondary path inverse-compensation filter to which a target sound is input, according to an embodiment of the present disclosure.

FIG. 11 is a block diagram of a sound control system in a vehicle with a secondary path inverse-compensation filter to which a target sound is input, according to an embodiment of the present disclosure, and FIG. 12 is a block diagram of an adaptive control logic with a secondary path inverse-compensation filter to which a target sound is input, according to an embodiment of the present disclosure. FIGS. 11 and 12 are described together to avoid overlapping explanation.

Referring to FIG. 11, a sound control system may include the engine 142, the speaker 143, the sound input unit 190, the rpm measurer 141, the amplifier 145, the Digital-to-Analog (DA) converter 146, the sound controller 147, the signal conditioner 148, and the Analog-to-Digital (AD) converter 149. The enumerated components are the same as what are described above, so the details will be omitted below.

The sound control system may include a secondary path compensation filter 153 and a secondary path inverse-compensation filter 154. Thus, the adaptive control logic of FIG. 12 may use both the estimated secondary path transfer function and the inverse function of the estimated secondary path transfer function.

The adaptive control logic of FIG. 12 may be designed such that x(n) is input to the secondary path compensation filter based on the estimated secondary path transfer function. Accordingly, the control block may design an adaptive filter to which x'(n) that has passed the secondary path compensation filter is input as an argument, as in the following equation 14:

$$w(n+1)=w(n)+\mu\cdot e(n)\cdot x'(n) \quad (14)$$

The adaptive control logic shown in FIG. 12 may be designed such that the target sound t(n) is input to the inverse function of the estimated secondary path transfer function. In an embodiment, the adaptive control logic may be designed to have a secondary path compensation filter based on the estimated secondary path transfer function before the control block, and a secondary path inverse-compensation filter based on the inverse function of the estimated secondary path transfer function after the control block. Accordingly, a target sound t'(n) that has passed the secondary path inverse-compensation filter may be represented as in the following equation 15:

$$t'(n)=\hat{S}^{-1}(n)*t(n) \quad (15)$$

The sound signal y(n) being output may be expressed as in the following equation 16:

$$y(n)=w(n)*x(n)-t'(n) \quad (16)$$

An error signal e(n) finally input through the sound input unit 190 may be represented as in the following equation 17, and the adaptive filter does not reflect the target sound t(n) as an argument because the sound control system in accordance with the embodiment of the present disclosure reflects t'(n) on the sound signal y(n) as in the equation 17:

$$e(n)=d(n)-y'(n) \quad (17)$$

The sound control system may use one of the adaptive control logics shown in FIGS. 4 to 12 to generate a sound effect that follows the target sound while canceling noise. Simulation results used in the adaptive control logic shown in FIGS. 4 to 7 among the aforementioned adaptive control logics will now be examined.

Figure 13A:
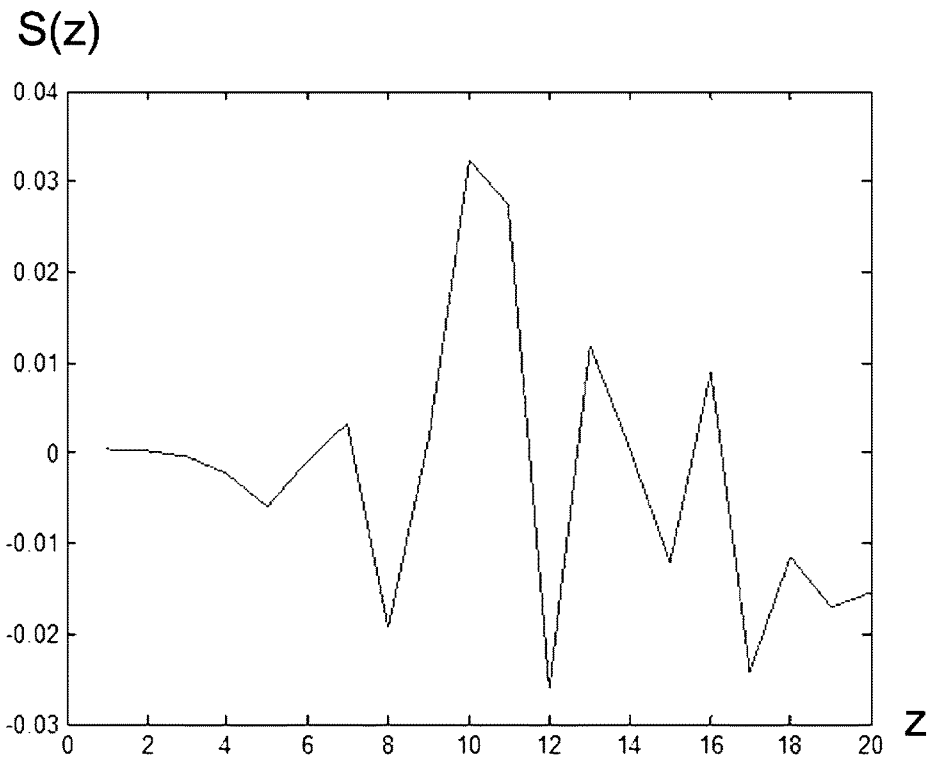
FIG. 13A is a graph representing a secondary path transfer function, according to an embodiment of the present disclosure.
Figure 13B:
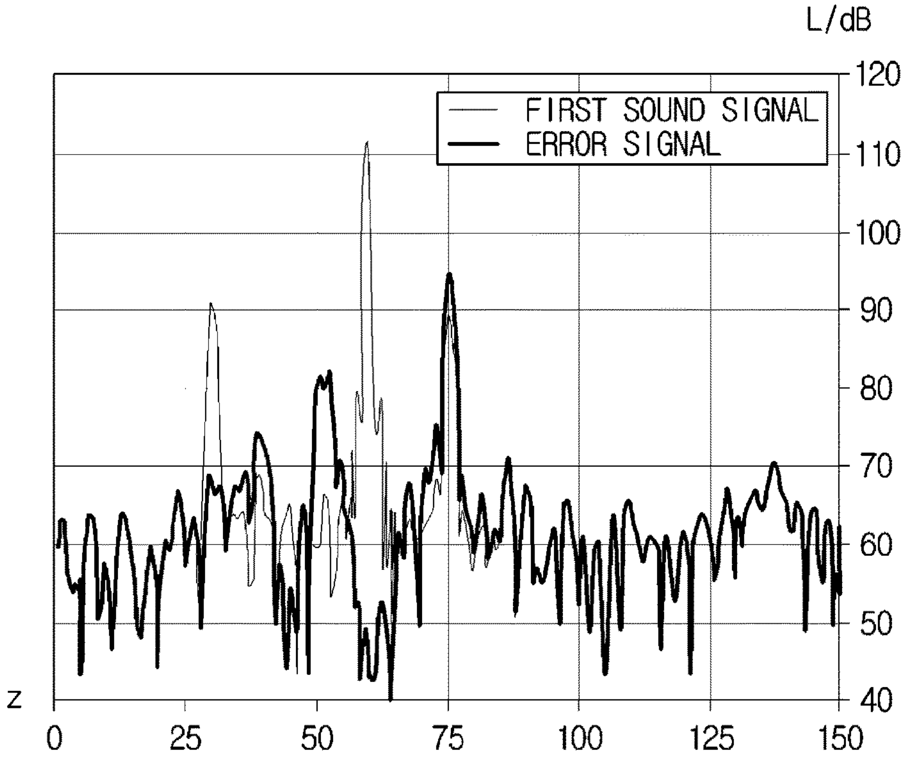
FIG. 13B is a graph for comparing a first sound signal and a first error signal based on the adaptive control logic shown in FIGS. 4 and 5, according to an embodiment of the present disclosure.

FIG. 13A is a graph representing a secondary path transfer function, according to an embodiment of the present disclosure, and FIG. 13B is a graph for comparing a first sound signal and a first error signal based on the adaptive control logic shown in FIGS. 4 and 5, according to an embodiment of the present disclosure.

Figure 14A:
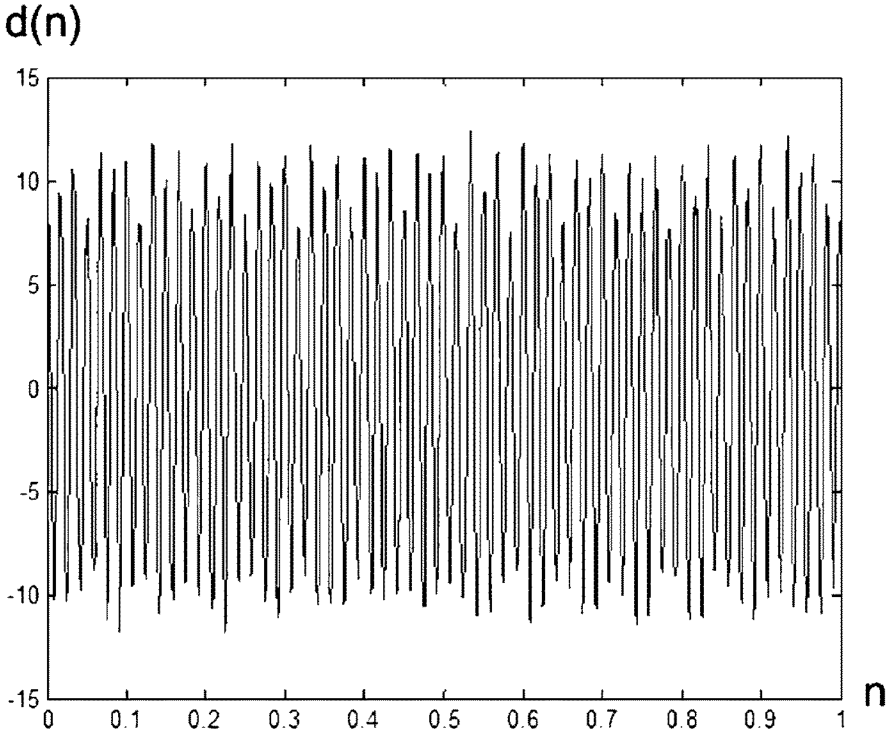
FIG. 14A is a graph representing a first sound signal, according to an embodiment of the present disclosure.
Figure 14B:
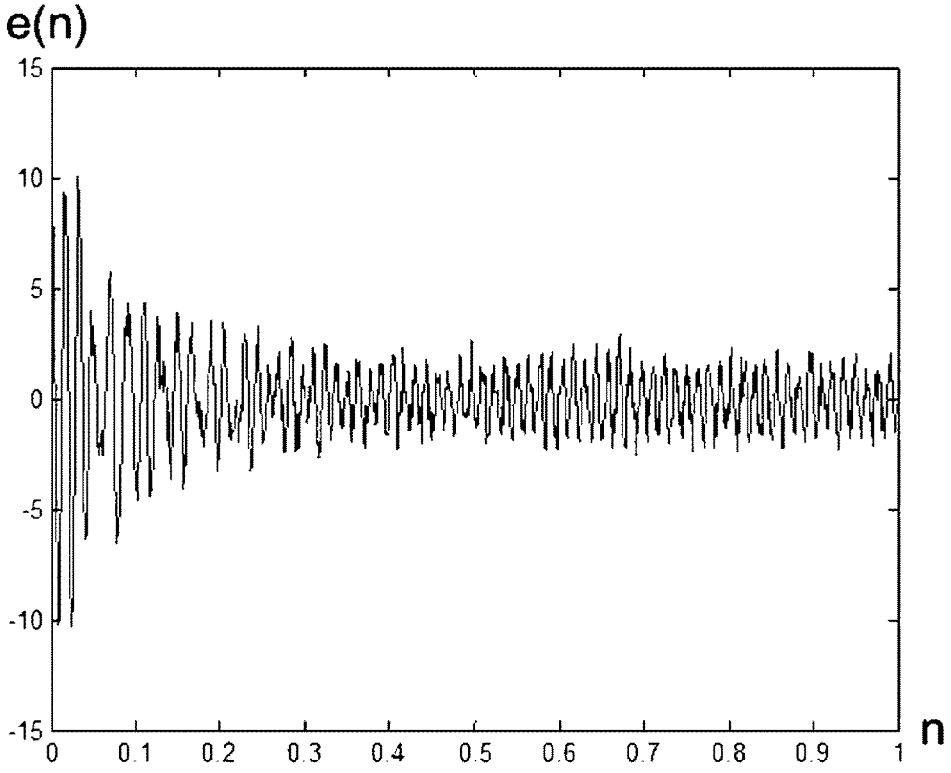
FIG. 14B is a graph representing an error signal based on the adaptive control logic shown in FIGS. 4 and 5, according to an embodiment of the present disclosure.
Figure 14C:
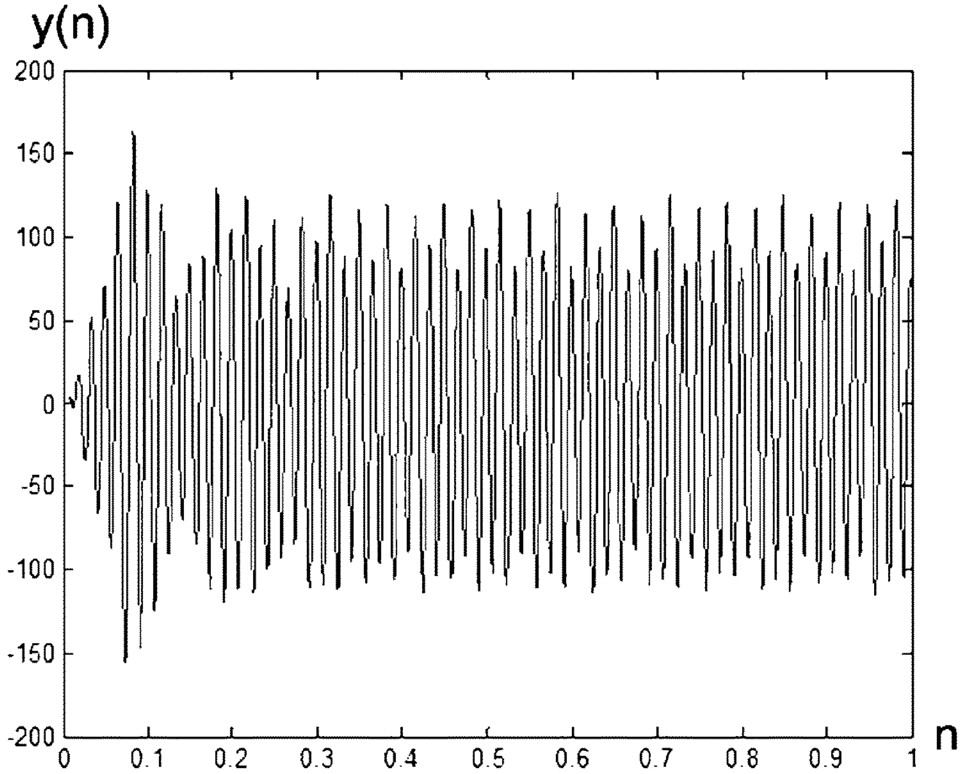
FIG. 14C is a graph representing a sound signal output from a control block of the adaptive control logic shown in FIGS. 4 and 5, according to an embodiment of the present disclosure.
Figure 14D:
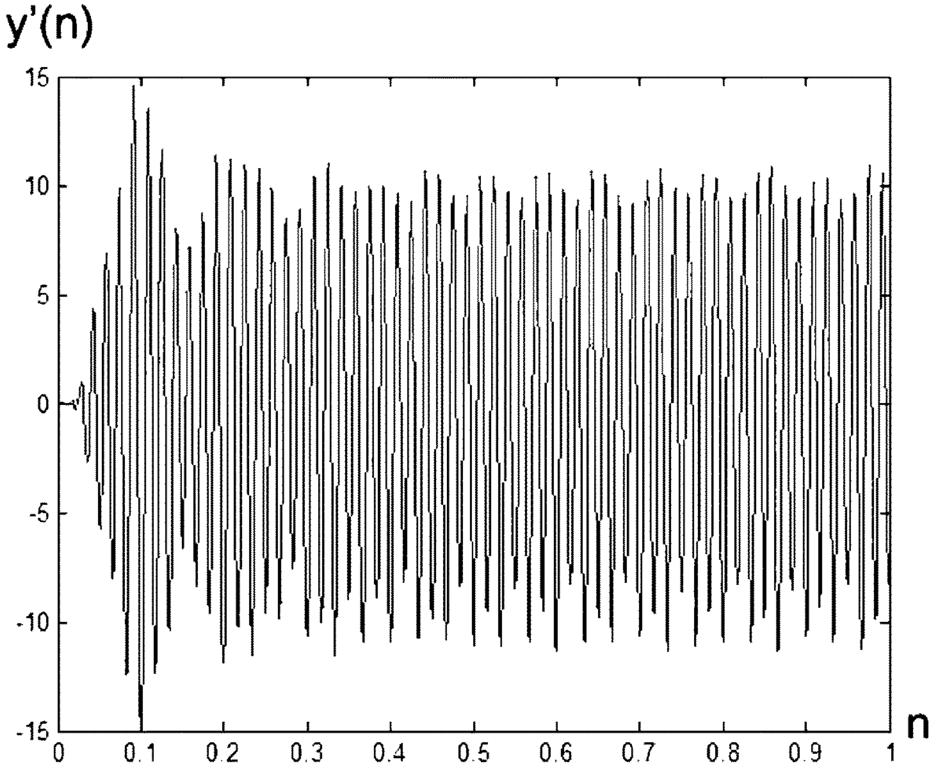
FIG. 14D is a graph representing a sound signal that has passed a secondary path, according to an embodiment of the present disclosure.

FIGS. 14A-14D provide graphs representing a sound signal waveform in the adaptive control logic shown in FIGS. 4 and 5, according to an embodiment of the present disclosure. Specifically, FIG. 14A is a graph representing a first sound signal, according to an embodiment of the present disclosure, FIG. 14B is a graph representing an error signal based on the adaptive control logic shown in FIGS. 4 and 5, according to an embodiment of the present disclosure, FIG. 14C is a graph representing a sound signal output from a control block of the adaptive control logic shown in FIGS. 4 and 5, according to an embodiment of the present disclosure, and FIG. 14D is a graph representing a sound signal that has passed a secondary path, according to an embodiment of the present disclosure. The figures are described together to avoid overlapping explanation.

The vehicle may derive a secondary path transfer function of FIG. 13A from a sound signal received through the sound input unit. In the graph, the x-axis represents time and the y-axis represents amplitude.

Specifically, the first sound signal d(n) may be embodied by setting a sampling frequency to 1,000 Hz and time data to 1 second and combining a sine wave whose amplitude is 10 and frequency is 60 Hz, a cosine wave whose amplitude is 1 and frequency is 30 Hz, a sine wave whose amplitude is 0.8 and frequency is 75 Hz, and a random signal whose peak is 0.5.

The control block of FIG. 5 may output a waveform y(n) shown in FIG. 14C. The second sound signal y'(n) that has passed the secondary path may have the form as shown in FIG. 14D. The first error signal e(n) equals to d(n)−y'(n), and may have the form as shown in FIG. 14B.

The graph of FIG. 13B may be obtained by performing a Fast Fourier Transform (FFT) on the first sound signal and first error signal. In the graph of FIG. 13B, the x-axis represents frequency f, and the y-axis represents Sound Pressure Level (SPL).

Examining the first error signal of FIG. 13B, it is observed that SPLs of frequency components of about 30 Hz and about 60 Hz of the first error signal become lower. That is, it is seen that noise in the frequency components of about 30 Hz and about 60 Hz is reduced.

Accordingly, the driver may feel less noise while driving the vehicle 1. Simulation results based on the adaptive control logic of FIGS. 6 and 7 will now be examined to take a look at the noise reduction performance as well as the target sound following performance.

Figure 15:
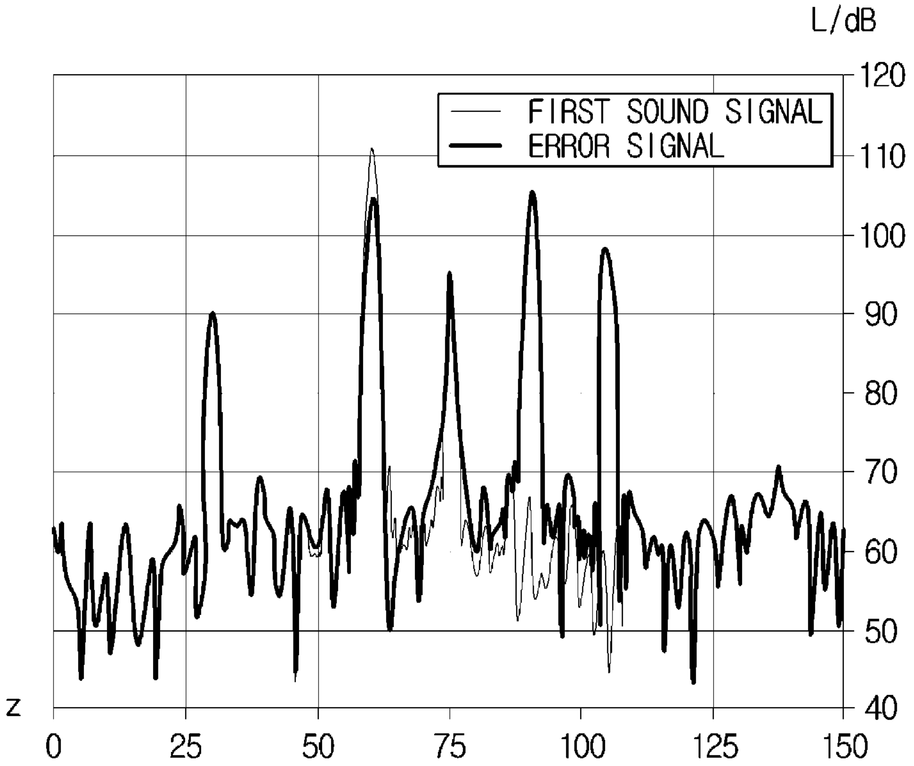
FIG. 15 is a graph for comparing a first sound signal and a second error signal based on the adaptive control logic shown in FIGS. 6 and 7, according to an embodiment of the present disclosure
Figure 16A:
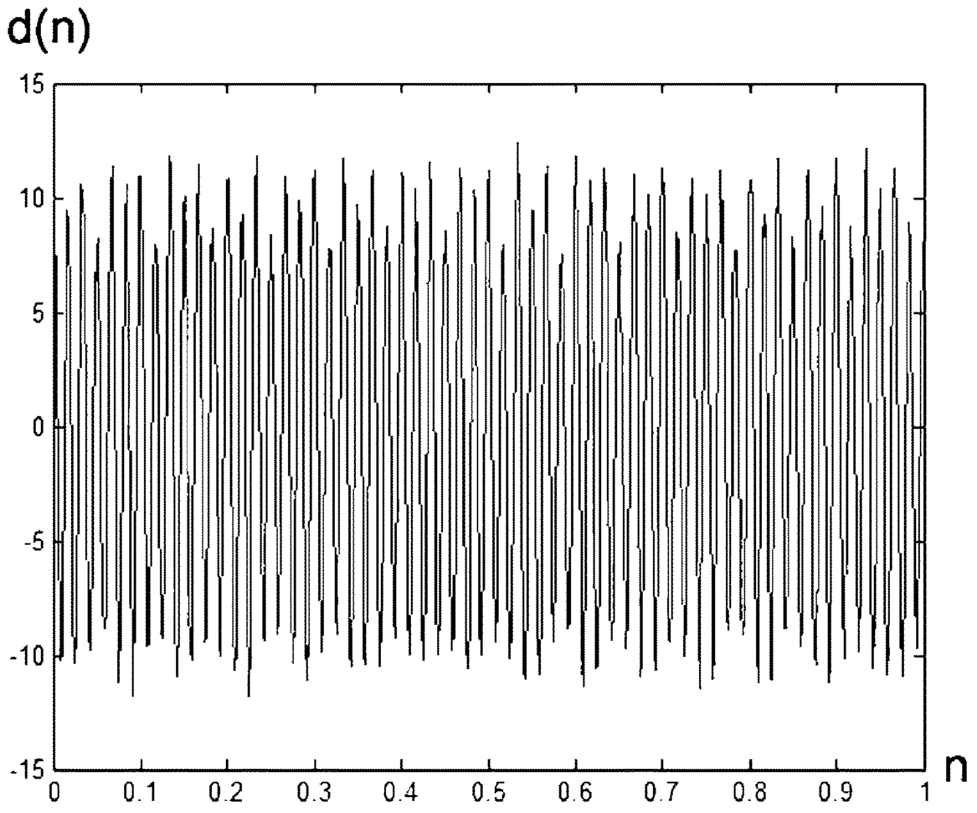
FIG. 16A is a graph representing a first sound signal, according to an embodiment of the present disclosure.
Figure 16B:
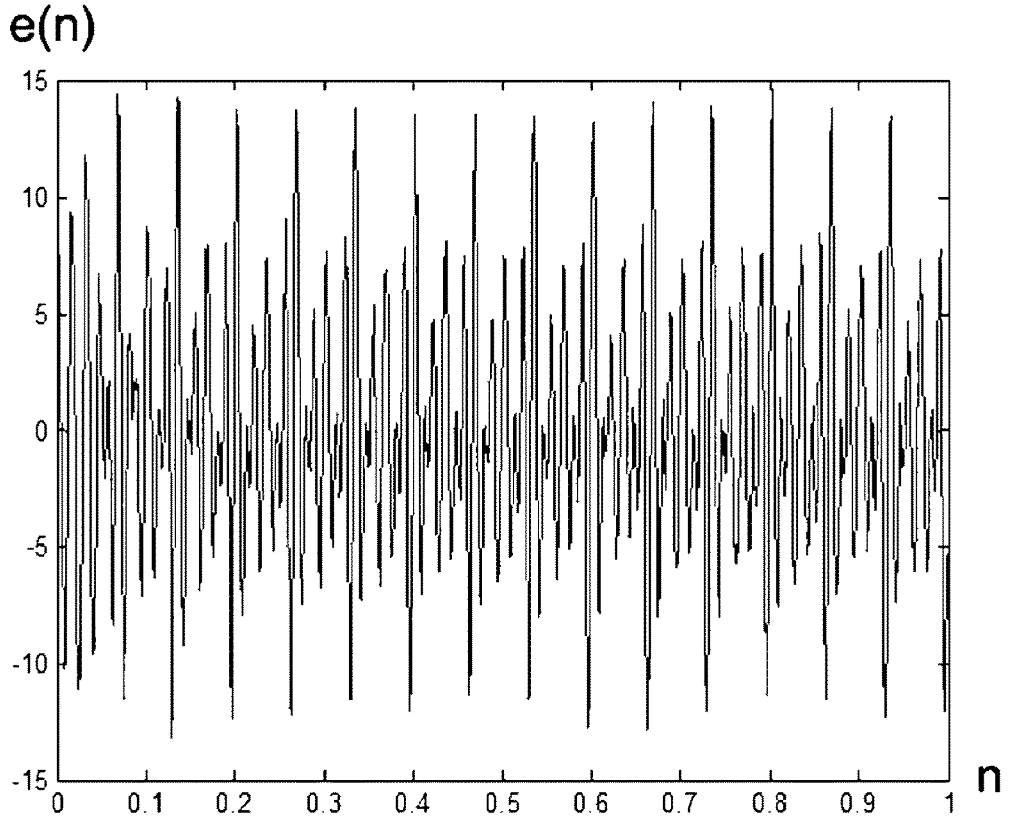
FIG. 16B is a graph representing an error signal based on the adaptive control logic shown in FIGS. 6 and 7, according to an embodiment of the present disclosure.
Figure 16C:
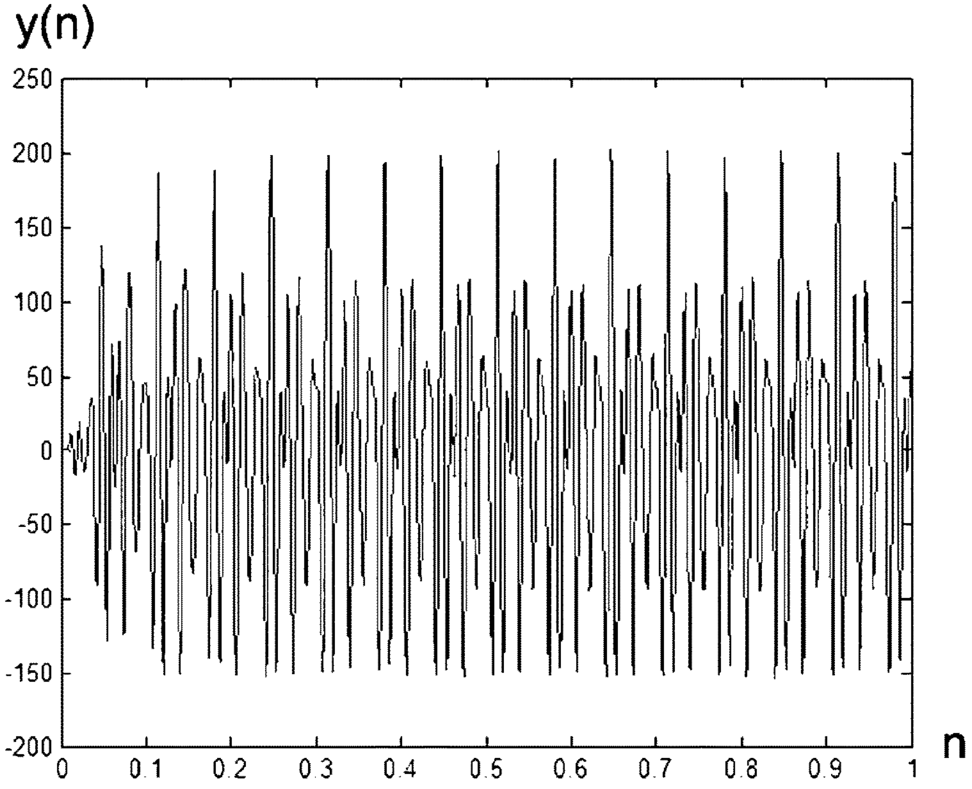
FIG. 16C is a graph representing a sound signal output from a control block shown in FIGS. 6 and 7, according to an embodiment of the present disclosure.
Figure 16D:
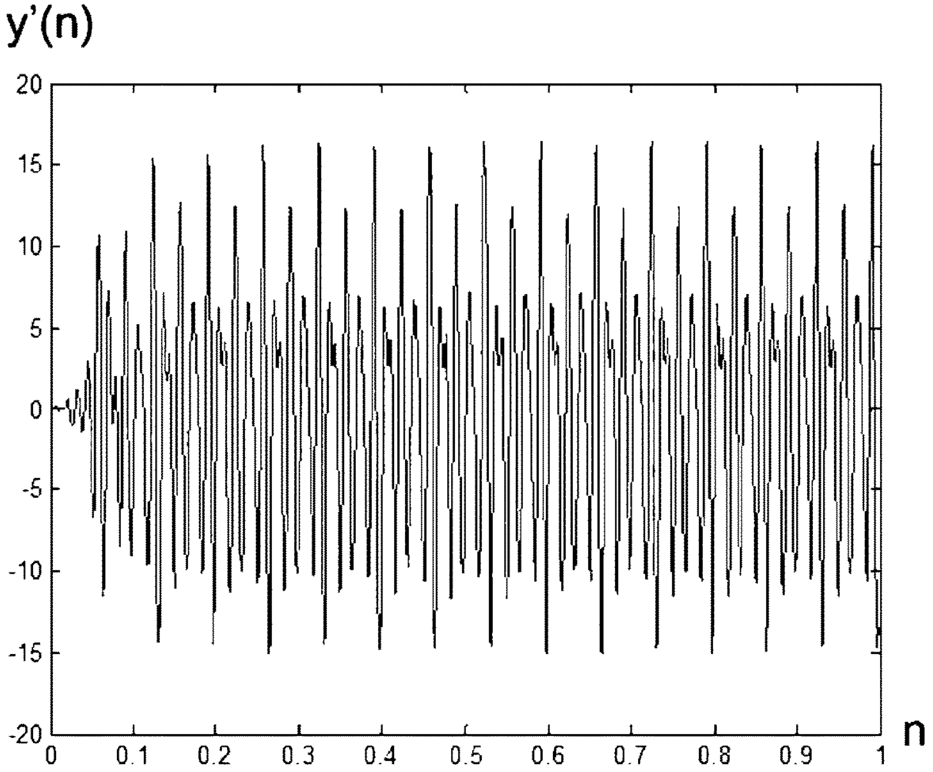
FIG. 16D is a graph representing a sound signal that has passed a secondary path, according to an embodiment of the present disclosure.

FIG. 15 is a graph for comparing a first sound signal and a second error signal based on the adaptive control logic shown in FIGS. 6 and 7, according to an embodiment of the present disclosure. Specifically, FIG. 16A is a graph representing a first sound signal, according to an embodiment of the present disclosure, and FIG. 16B is a graph representing an error signal based on the adaptive control logic shown in FIGS. 6 and 7, according to an embodiment of the present disclosure. FIG. 16C is a graph representing a sound signal output from the control block shown in FIGS. 6 and 7, according to an embodiment of the present disclosure, FIG. 16D is a graph representing a sound signal that has passed a secondary path, according to an embodiment of the present disclosure.

The first sound signal d(n) shown in FIG. 16A is designed under the same condition for the first sound signal d(n) of FIG. 14A, so the details will be omitted in the following description. For simulation, the secondary path transfer function shown in FIG. 13A may be used.

The target sound t(n) may be embodied by combining a sine wave whose amplitude is 5 and frequency is about 60 Hz, a sine wave whose amplitude is 5 and frequency is about 90 Hz, and a sine wave whose amplitude is 2 and frequency is about 105 Hz. For example, if a sound of about 60 Hz from the engine sound is assumed to be a second component, a sound of about 90 Hz may be the third component and a sound of about 105 Hz may be the 3.5th component.

The graph of FIG. 15 may be obtained by performing an FFT on the first sound signal and second error signal. In the graph of FIG. 15, the x-axis represents frequency f, and they-axis represents SPL.

Specifically, in FIG. 15, it may be seen that the 60 Hz and 90 Hz components of each of the second error signal and the first sound signal correspond to level 5 of the target sound. According to the simulation results, it is seen that the output sound effect may follow the target sound while canceling the noise. Internal features of the vehicle including the sound control device will now be briefly described.

Figure 17A:
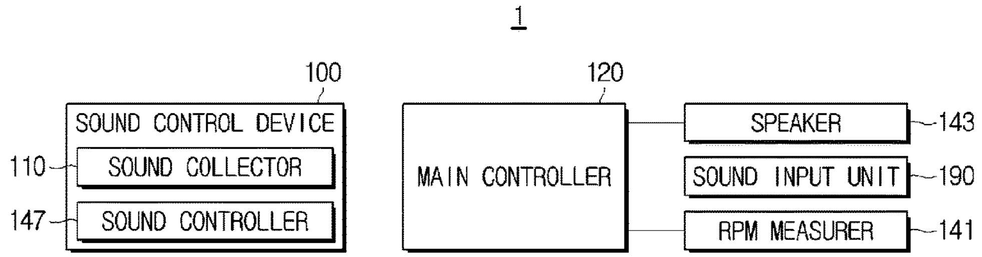
FIGS. 17A and 17B are control block diagrams of a vehicle including a sound control device, according to another embodiment of the present disclosure.
Figure 17B:
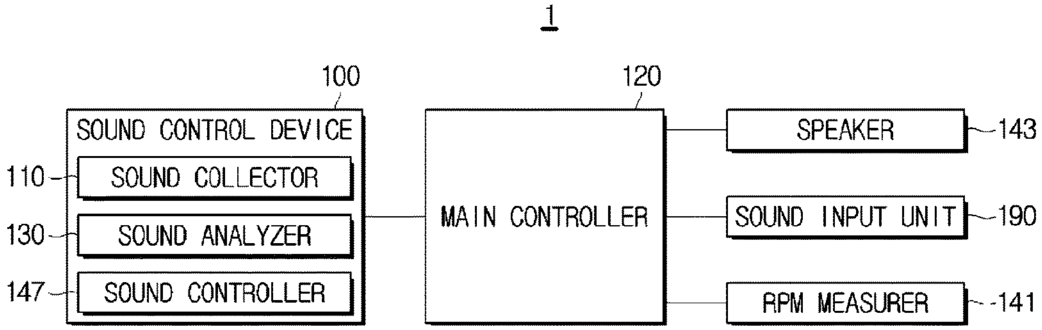

FIGS. 17A and 17B are control block diagrams of a vehicle including a sound control device, according to another embodiment of the present disclosure.

Referring to FIG. 17A, the vehicle 1 may include a sound control device 100, a speaker 143, a sound input unit 190, an rpm measurer 141, and a main controller 120. The speaker 143, sound input unit 190, and rpm measurer 141 were described above, so the details will be omitted in the following description.

The components in the vehicle 1 may exchange various information over a communication network in the vehicle. The communication network in the vehicle 1 supports data transmission or reception between various devices equipped in the vehicle 1. For example, the communication network in the vehicle 1 includes a Controller Area Network (CAN). The CAN is a network for vehicle to support digital serial communication between the various devices in the vehicle 1 and support real-time communication by replacing complicated electric wires and relays of the electronic devices in the vehicle 1 by serial communication lines. The communication network in the vehicle 1 is, however, not limited thereto, but may use any communication network for vehicle known to the public to transmit or receive data between the devices in the vehicle 1.

The sound control device 100 may include a sound collector 110 and a sound controller 147. The sound collector 110 and sound controller 147 may be implemented in a way of being integrated on an SoC or circuit board or implemented independently, without being limited thereto.

The sound collector 110 may collect various sound signals detected from inside the vehicle 1. For example, the sound collector 110 may collect a third sound signal x(n) through e.g., a microphone arranged around the engine 142, and in addition, collect information about sound signals deformed along various paths, such as the first sound signal and the second sound signal.

The sound collector 147 may control general operation of the sound control device 100. For example, the sound controller 147 may be implemented by a processor capable of performing various signal processes and operation and a memory that stores control data of the sound control device 100. Accordingly, the sound controller 147 may generate control signals using the control data, and control general operation of the sound control device 100 according to the generated control signals. In addition, the sound controller 147 may control overall operation of the sound control system in cooperation with the main controller 120 with the control signals.

The sound controller 147 may generate sound effects according to the adaptive control logic shown in FIGS. 4 to 12. For example, the sound controller 147 may have a memory for storing data related to the adaptive control logic shown in FIGS. 4 to 12, and reconstruct a sound effect using the data stored in the memory.

The sound controller 147 may determine which one of the plurality of adaptive control logics is to reconstruct the sound effect.

For example, the sound controller 147 may select an adaptive control logic based on the estimated secondary path transfer function. In an embodiment, data about the estimated secondary path transfer function may be stored in the memory of the sound controller 147. Since characteristics of the vehicle 1 are reflected in the estimated secondary path transfer function, the estimated secondary path transfer function may be different depending on the structural features or specification of the vehicle 1. Accordingly, the sound controller 147 may select an estimated secondary path transfer function corresponding to information about the vehicle equipped with the sound control device 100, and select an adaptive control logic according to the form of the selected estimated secondary path transfer function, i.e., the form of the secondary path compensation filter. In an embodiment, the sound controller 147 may select an adaptive control logic based on the number of poles and 0's of the estimated secondary path transfer function.

In another embodiment, the sound controller 147 may select an adaptive control logic based on control stability of the sound control device 100. An adaptive control logic that uses the inverse function of the estimated secondary path transfer function requires high amounts of calculation and fast real-time processing. Accordingly, the sound controller 147 may determine control stability of the sound control device 100, and select an adaptive control logic that uses the inverse function of the estimated secondary path transfer function if the control stability of the sound control device 100 is greater than a predetermined level.

In the meantime, referring to FIG. 17B, the sound control device 100 may further include a sound analyzer 130. The sound analyzer 130 may be separately present as shown in FIG. 17A, or may be integrated in the sound controller 147. In the latter case, operation of the sound analyzer 130 may be performed by the sound controller 147.

The sound analyzer 130 may determine a pre-filter through offline adaptive control logic. For example, a large amount of calculation may be required in estimating primary and secondary paths in real time. Especially, even if the secondary path is already estimated in advance, a large amount of calculation is required for inverse estimation of the secondary path is also required as well, causing overload.

Accordingly, the sound analyzer 130 may calculate a substitute of the inverse function of the estimated secondary path transfer function, i.e., a pre-filter value by inputting a sample signal, e.g., a white noise signal, to the offline adaptive control logic. The sound controller 147 may then substitute the calculated pre-filter value to an online adaptive control logic, thus enabling faster calculation.

The main controller 120 may be equipped in the vehicle 1 for controlling overall operation of the vehicle 1. For example, the main controller 120 may be implemented by a processor such as MCU and a memory. The data stored in the memory of the sound controller 147 may even be collectively stored in the memory of the main controller 120, without being limited thereto.

For example, the main controller 120 may send the sound signal input through the sound input unit 190 to the sound control device 100. Further, the main controller 120 may control the speaker 143 to output a sound effect according to a control signal of the sound control device 100.

Figure 18:
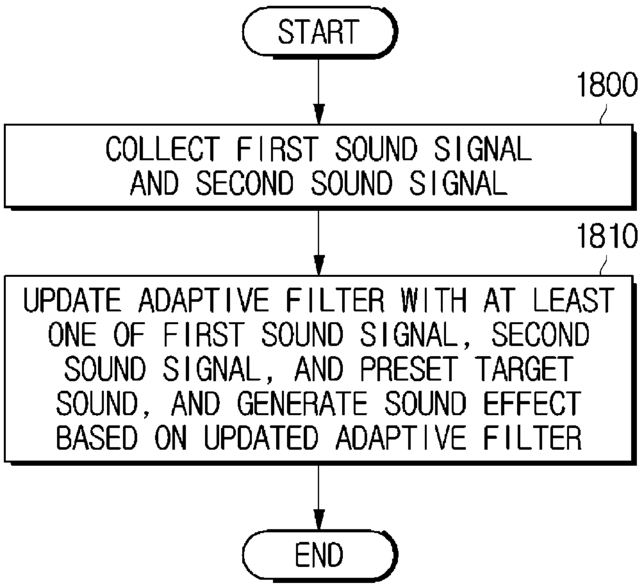
FIG. 18 is a flowchart of operation of a vehicle to generate sound effects based on an adaptive filter updated using at least one of a first sound, a second sound, and a predetermined target sound, according to an embodiment of the present disclosure.

FIG. 18 is a flowchart of operation of a vehicle to generate sound effects based on an adaptive filter updated with at least one of a first sound, a second sound, and a predetermined target sound, according to an embodiment of the present disclosure.

In the vehicle, a variety of sound signals may be generated. For example, various sound signals may be generated from many different devices equipped in the vehicle and outside environments. Accordingly, the vehicle may collect sound signals through at least one sound input unit arranged in the vehicle.

For example, the vehicle may collect the first sound signal delivered from the primary path between a noise source and one of the at least one sound input unit, and the second sound signal delivered from the secondary path between the speaker and one of the at least one sound input unit, in 1800. In addition, the vehicle may also collect a third sound signal delivered through the sound input unit arranged around a noise source.

Accordingly, the vehicle may update the adaptive filter in the adaptive control logic with the at least one of the first sound signal, the second sound signal, and a predetermined target sound, and generate a sound effect based on the updated adaptive filter, in 1810. The types of the adaptive control logic and equations of the adaptive filter were described above, so the details will be omitted in the following description.

The vehicle may have various adaptive control logics, and may select a suitable adaptive control logic based on information about the vehicle and generate a sound effect using the selected adaptive control logic. The information about the vehicle is information to identify the vehicle, including model information, structure information of the vehicle.

The suitable adaptive control logic may be different depending on the information about the vehicle. Accordingly, the vehicle in accordance with embodiments of the present disclosure may provide a more suitable sound effect for the driver by selecting an adaptive control logic that fits the information about the vehicle. For example, the form of the estimated secondary path transfer function may be different depending on the vehicle. Accordingly, the vehicle may select an estimated secondary path transfer function corresponding to the vehicle information, and determine a suitable adaptive control logic based on the form of the estimated secondary path transfer function.

In an embodiment, in a case of using the adaptive control logic of FIGS. 6 and 7 that uses the inverse function of the estimated secondary path transfer function, if the form of the estimated secondary path transfer function is complicated, it may cause calculation overload. The vehicle may use the adaptive control logic shown in FIGS. 4 and 5, or the adaptive control logic shown in FIGS. 8 to 12.

Figure 19:
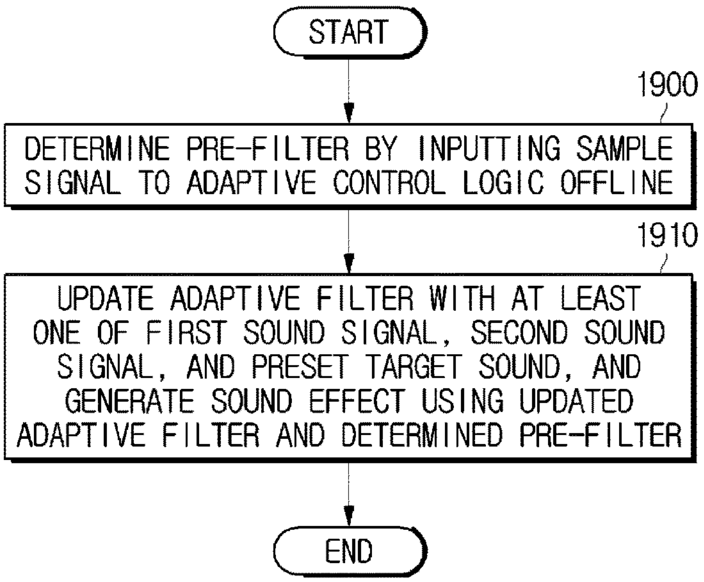
FIG. 19 is a flowchart of operation of a vehicle to determine a pre-filter using an offline adaptive control logic and generate sound effects by substituting the pre-filter for an online adaptive control logic, according to an embodiment of the present disclosure.

FIG. 19 is a flowchart of operation of a vehicle to determine a pre-filter using an offline adaptive control logic and generate sound effects by substituting the pre-filter for an online adaptive control logic, according to an embodiment of the present disclosure.

In the vehicle, a variety of sound signals may be generated. For example, various sound signals may be generated from many different devices equipped in the vehicle and due to outside environments. Accordingly, the vehicle may collect sound signals through at least one sound input unit arranged in the vehicle, and generate a sound effect based on the collected results.

In this regard, before generating the sound effect, the vehicle may input a sample signal to an offline adaptive control logic to determine a pre-filter, in 1900. The sample signal is a sound signal for determining the pre-filter, and includes a white noise signal, for example. The offline adaptive control logic is shown in FIG. 9, so the details will be omitted in the following description.

The vehicle may substitute an online adaptive control logic with the determined pre-filter value and at the same time, update the adaptive filter with at least one of the first sound signal, the second sound signal, and the predetermined target sound, and may thus generate a sound effect faster. The online adaptive control logic is shown in FIG. 10, so the details will be omitted in the following description.

The pre-filter may substitute the secondary path inverse-compensation filter with a smaller amount of calculation. Accordingly, if it is determined that the form of the estimated secondary path transfer function is complicated, the vehicle may embody a sound effect through an adaptive control logic that uses the pre-filter. Embodiments of the sound control device, vehicle, and method for controlling the sound control device may provide a user with superb sound effects of no deviation in quality regardless of circumstantial changes.

What is claimed is:

1. A sound control device, comprising:

a sound collector for collecting a first sound signal generated from a noise source and deformed along a primary path between the noise source and a sound input unit, and a second sound signal generated through a speaker and deformed along a secondary path between the speaker and the sound input unit; and a sound controller for updating an adaptive filter in a designed adaptive control logic with at least one of the collected first and second sound signals and a preset target sound, and generating a sound effect that reflects the secondary path based on the updated adaptive filter, wherein the noise source comprises an engine mounted in a vehicle, and wherein the sound controller is configured to select a target sound corresponding to revolution per minute (rpm) of the engine from among a plurality of preset target sounds and update the adaptive filter by using a value resulting from subtraction of the selected target wound from a sum of the first and second sound signals as an argument.

2. The sound control device of claim 1, wherein the sound collector is configured to receive a third sound signal generated from the noise source through another sound input unit arranged around the sound source, and wherein the sound controller is configured to update the adaptive filter by using a value resulting from application of a secondary path compensation filter generated based on an estimated secondary path transfer function to the third sound signal, the first sound signal, the second sound signal, and the preset target sound as arguments.

3. The sound control device of claim 1, wherein the sound controller is configured to generate the sound effect based on the updated adaptive filter and a secondary path inverse-compensation filter generated based on the inverse function of an estimated secondary path transfer function.

4. The sound control device of claim 1, wherein the sound controller is configured to update an adaptive filter in the adaptive control logic with the collected first and second sound signals and generate a sound effect by subtracting a value resulting from application of the preset target sound to a secondary path inverse-compensation filter generated based on the inverse function of an estimated secondary path transfer function from a value derived from the updated adaptive filter.

5. The sound control device of claim 1, wherein the sound controller is configured to use data related to estimated secondary path transfer functions stored in a memory to select an estimated secondary path transfer function corresponding to vehicle information, and to determine an adaptive control logic to generate a sound effect based on a form of the selected estimated secondary path transfer function.

6. A sound control device comprising:

an analyzer for determining a pre-filter by inputting a sample signal to an adaptive control logic offline; and a sound controller for updating an adaptive filter included in an online adaptive control logic with a first sound signal generated from a noise source and deformed along a primary path between the noise source and a sound input unit, a second sound signal generated through a speaker and deformed along a secondary path between the speaker and the sound input unit, and a preset target sound, and generating a sound effect using the updated adaptive filter and the determined pre-filter, wherein the noise source comprises an engine mounted in a vehicle, and wherein the sound controller is configured to select a target sound corresponding to revolution per minute (rpm) of the engine from among a plurality of preset target sounds and update the adaptive filter by using a value resulting from subtraction of the selected target wound from a sum of the first and second sound signals as an argument.

7. The sound control device of claim 6, further comprising:

a sound collector for collecting at least one of the first sound signal, the second sound signal, and a third sound signal input through a sound input unit arranged around the noise source.

8. The sound control device of claim 6, wherein the sound controller is configured to update the adaptive filter by using the first sound signal, the second sound signal, a third sound signal input through a sound input unit arranged around the noise source, and the preset target sound as arguments.

9. A method for controlling a vehicle, comprising the steps of:

collecting a first sound signal generated from a noise source and deformed along a primary path between the noise source and a sound input unit, and a second sound signal generated through a speaker and deformed along a secondary path between the speaker and the sound input unit;

updating an adaptive filter in a designed adaptive control logic with at least one of the collected first and second sound signals and a preset target sound; and generating a sound effect that reflects the secondary path based on the updated adaptive filter, wherein the generating step further comprises selecting a target sound corresponding to revolutions per minute (rpm) of an engine from among preset target sounds and updating the adaptive filter by using a value resulting from subtraction of the selected target sound from a sum of the first and second sound signals as an argument.

10. The method of claim 9, wherein the collecting step further comprises: receiving a third sound signal generated from the noise source through another sound input unit arranged around the sound source; and the generating step further comprises: updating the adaptive filter by using a value resulting from application of a secondary path compensation filter generated based on an estimated secondary path transfer function to the third sound signal, the first sound signal, the second sound signal, and the preset target sound as arguments.

11. The method of claim 9, wherein the generating step further comprises:

generating the sound effect based on the updated adaptive filter and a secondary path inverse-compensation filter generated based on the inverse function of an estimated secondary path transfer function.

12. The method of claim 9, wherein the generating step further comprises:

updating an adaptive filter in the adaptive control logic with the collected first and second sound signals and generate a sound effect by subtracting a value resulting from application of the preset target sound to a secondary path inverse-compensation filter generated based on the inverse function of an estimated secondary path transfer function from a value derived from the updated adaptive filter.

* * * * *